US008819300B2

(12) United States Patent  
Abe

(10) Patent No.: US 8,819,300 B2  
(45) Date of Patent: Aug. 26, 2014

(54) INFORMATION PROCESSING APPARATUS, DISPLAY METHOD, AND STORAGE MEDIUM

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 13/277,890

(22) Filed: Oct. 20, 2011

(65) Prior Publication Data

US 2012/0110213 A1 May 3, 2012

(30) Foreign Application Priority Data

Oct. 29, 2010 (JP) ................................ 2010-243255  
Aug. 26, 2011 (JP) ................................ 2011-185074

(51) Int. Cl.
*G06F 13/10* (2006.01)
*H04N 1/00* (2006.01)
*G06F 9/44* (2006.01)
*G06F 3/12* (2006.01)

(52) U.S. Cl.
CPC .......... *G06F 3/1225* (2013.01); *H04N 1/00244* (2013.01); *H04N 1/00464* (2013.01); *G06F 9/4411* (2013.01); *H04N 2201/0094* (2013.01); *H04N 2201/0039* (2013.01); *G06F 3/1287* (2013.01); *G06F 3/1204* (2013.01)
USPC .............................................. 710/10; 710/62

(58) Field of Classification Search
None
See application file for complete search history.

(56) References Cited

U.S. PATENT DOCUMENTS

| 2006/0221370 A1* | 10/2006 | Iida .............................. 358/1.13 |
| 2008/0263047 A1* | 10/2008 | Yin et al. .......................... 707/9 |
| 2008/0301661 A1* | 12/2008 | Haynes et al. ................. 717/170 |
| 2011/0066960 A1* | 3/2011 | Suzuki .......................... 715/764 |

FOREIGN PATENT DOCUMENTS

JP 6-067893 A 3/1994

* cited by examiner

*Primary Examiner* — Ilwoo Park  
(74) *Attorney, Agent, or Firm* — Canon U.S.A., Inc. IP Division

(57) ABSTRACT

A peripheral apparatus management unit of an information processing apparatus includes an acquisition function for acquiring version information of an operating system. The unit further includes a selection function for selecting peripheral apparatus management function control information that defines information required to construct a view content of a peripheral apparatus management screen that includes a function related object, based on the version information of the operating system acquired by the acquisition function. The unit further includes an installation function for installing the peripheral apparatus management function control information selected by the selection function on the information processing apparatus. The unit further includes a display function for reading the peripheral apparatus management function control information installed by the installation function, constructing the view content of the peripheral apparatus management screen based on the peripheral apparatus management function control information, and displaying the peripheral apparatus management screen.

21 Claims, 21 Drawing Sheets

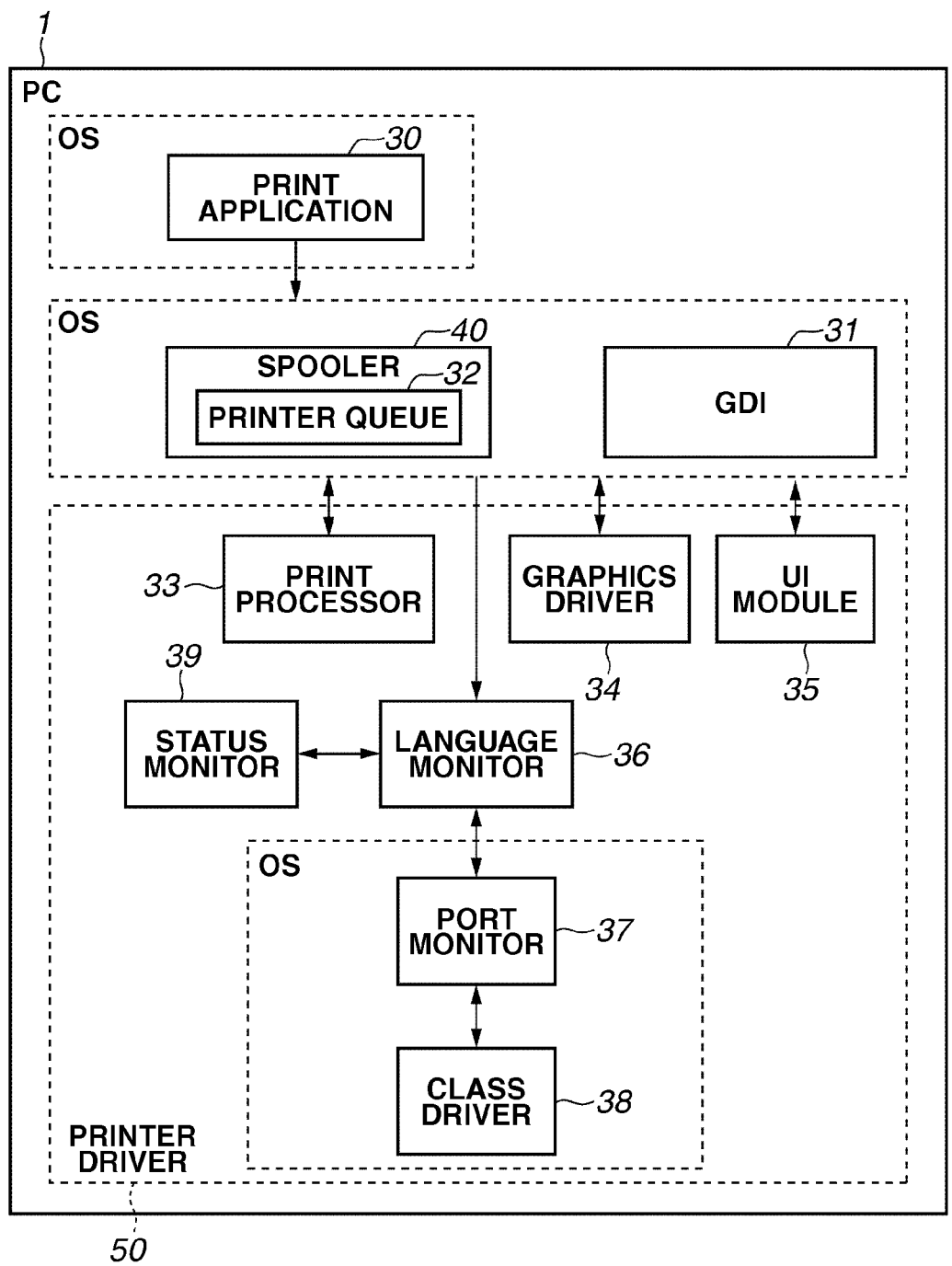

```
<?xml version="1.0" encoding="utf-8"?>
<dm:deviceManagement xmlns:dm="http://abc.xxx/dm/control">
  <dm:availableOS>Windows Z<dm:availableOS> ~814
  <dm:manufacturer>ABC</dm:manufacturer> ~801
  <dm:model>Kmmn</dm:model> ~802
  <dm:functions> ~803
    <dm:function id="1"> ~804                                              806
      <dm:name xml:lang="en-US">Printing Preferences</dm:name> ~805
      <dm:description xml:lang="en-US">Display the printing preferences window.</dm:description>
      <dm:icon>preferences.ico</dm:icon> ~807
      <dm:execute>printingPreferences "ABC Kmmn" </dm:execute> ~808
    <dm:function>
    <dm:function id="2"> ~809                                              811
      <dm:name xml:lang="en-US">Get the Latest Software</dm:name> ~810
      <dm:description xml:lang="en-US">Get and install the latest software.</dm:description>
      <dm:icon>get.ico</dm:icon> ~812
      <dm:execute>http://abc.xxx/download/kmmn_win_z_update.exe</dm:execute> ~813
    <dm:function>
  <dm:functions>
<dm:deviceManagement>
```

```
<?xml version="1.0" encoding="utf-8"?>
<dm:deviceManagement xmlns:dm="http://abc.xxx/dm/control">
  <dm:manufacturer>ABC</dm:manufacturer> ~801
  <dm:model>Kmmn</dm:model> ~802
  <dm:functions> ~821
    <dm:function id="1"> ~804                                              806
      <dm:name xml:lang="en-US">Printing Preferences</dm:name> ~805
      <dm:description xml:lang="en-US">Display the printing preferences window.</dm:description>
      <dm:icon>preferences.ico</dm:icon> ~807
      <dm:execute>printingPreferences "ABC Kmmn" </dm:execute> ~808
    <dm:function>
  <dm:functions>
<dm:deviceManagement>
```

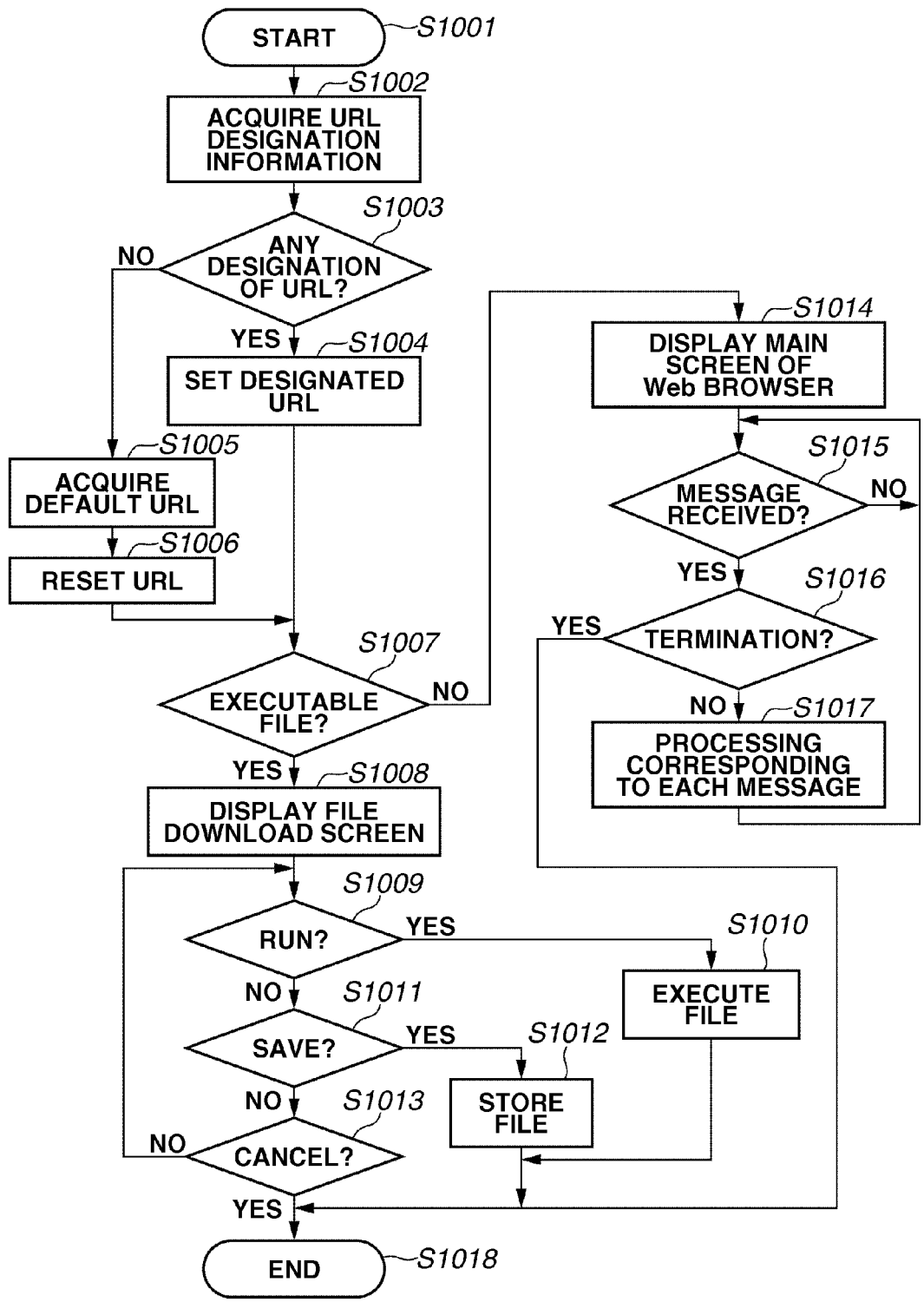

FIG.15A 830

```
<?xml version="1.0"encoding="utf-8"?>
<dm:deviceManagement xmlns:dm="http://abc.xxx/dm/control">
  <dm:metadataVersion>2.0</dm:metadataVersion> ~839
  <dm:manufacturer>ABC</dm:manufacturer>~801
  <dm:model>Kmmn</dm:model> ~802
  <dm:functions> ~831
    <dm:function id="1">~804                                      806
      <dm:name xml:lang="en-US">Printing Preferences</dm:name>~805
      <dm:description xml:lang="en-US">Display the printing preferences window.</dm:description>
      <dm:icon>preferences.ico</dm:icon>~807
      <dm:execute>printingPreferences "ABC Kmmn"</dm:execute>~808
    <dm:function>
    <dm:function id="2"> ~832                                     811
      <dm:name xml:lang="en-US">Get the Latest Software</dm:name>~810
      <dm:description xml:lang="en-US">Get and install the latest software.</dm:description>
      <dm:icon>get.ico</dm:icon> ~812
      <dm:required>~836
        <dm:osVersion>Windows Z</dm:osVersion>~837
      <dm:required>
      <dm:execute>http://abc.xxx/download/kmmn_win_z_update.exe</dm:execute>~813
    <dm:function>
  <dm:functions>
<dm:deviceManagement>
```

FIG.15B 840

```
<?xml version="1.0"encoding="utf-8"?>
<dm:deviceManagement xmlns:dm="http://abc.xxx/dm/control">
  <dm:metadataVersion>2.0</dm:metadataVersion> ~839
  <dm:manufacturer>ABC</dm:manufacturer>~801
  <dm:model>Kmmn</dm:model> ~802
  <dm:functions> ~841
    <dm:function id="1">~804                                      806
      <dm:name xml:lang="en-US">Printing Preferences</dm:name>~805
      <dm:description xml:lang="en-US">Display the printing preferences window.</dm:description>
      <dm:icon>preferences.ico</dm:icon>~807
      <dm:execute>printingPreferences "ABC Kmmn"</dm:execute>~808
    <dm:function>
    <dm:function id="2"> ~842                                     811
      <dm:name xml:lang="en-US">Get the Latest Software</dm:name>~810
      <dm:description xml:lang="en-US">Get and install the latest software.</dm:description>
      <dm:icon>get.ico</dm:icon> ~812
      <dm:required>~846
        <dm:osVersion>Windows Z</dm:osVersion>~847
      <dm:required>
      <dm:execute>http://abc.xxx/download/kmmn/wz/default.html</dm:execute>~848
    <dm:function>
  <dm:functions>
<dm:deviceManagement>
```

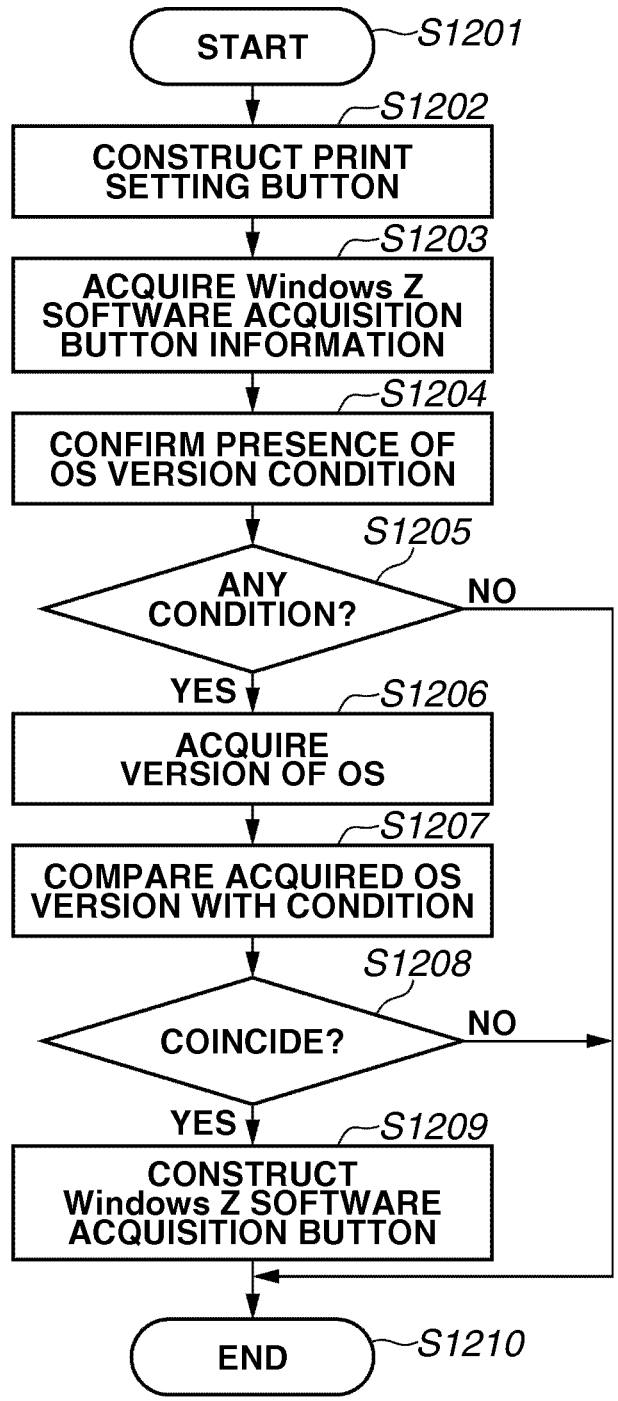

FIG.17A 850

```
<?xml version="1.0"encoding="utf-8"?>
<dm:deviceManagement xmlns:dm="http://abc.xxx/dm/control">
  <dm:manufacturer>ABC</dm:manufacturer> —801
  <dm:model>Kmmn</dm:model> —802
  <dm:functions> —851
    <dm:function id="1"> —804                                      806
      <dm:name xml:lang="en-US">Printing Preferences</dm:name> —805
      <dm:description xml:lang="en-US">Display the printing preferences window.</dm:description>
      <dm:icon>preferences.ico</dm:icon> —807
      <dm:execute>printingPreferences "ABC Kmmn"</dm:execute> —808
    <dm:function>
    <dm:function id="2"> —852                                      811
      <dm:name xml:lang="en-US">Get the Latest Software</dm:name> —810
      <dm:description xml:lang="en-US">Get and install the latest software.</dm:description>
      <dm:icon>get.ico</dm:icon> —812
      <dm:required> —856
        <dm:keywordInRegistry key="HKLM\SOFTWARE\ABC\Printer Driver"name="OSVsersion"
          Windows Z</dm:keywordInRegistry> —857
      <dm:required>
      <dm:execute>http://abc.xxx/download/kmmn_win_z_update.exe</dm:execute> —813
    <dm:function>
  <dm:functions>
<dm:deviceManagement>
```

FIG.17B 870

```
<?xml version="1.0"encoding="utf-8"?>
<dm:deviceManagement xmlns:dm="http://abc.xxx/dm/control">
  <dm:manufacturer>ABC</dm:manufacturer> —801
  <dm:model>Kmmn</dm:model> —802
  <dm:functions> —871
    <dm:function id="1"> —804                                      806
      <dm:name xml:lang="en-US">Printing Preferences</dm:name> —805
      <dm:description xml:lang="en-US">Display the printing preferences window.</dm:description>
      <dm:icon>preferences.ico</dm:icon> —807
      <dm:execute>printingPreferences "ABC Kmmn"</dm:execute> —808
    <dm:function>
    <dm:function id="2"> —872                                      811
      <dm:name xml:lang="en-US">Get the Latest Software</dm:name> —810
      <dm:description xml:lang="en-US">Get and install the latest software.</dm:description>
      <dm:icon>get.ico</dm:icon> —812
      <dm:required> —876
        <dm:keywordInRegistry key="PRINTER_DRIVER_FRIENDLY_NAME"name="OSVsersion"
          Windows Z</dm:keywordInRegistry> —877
      <dm:required>
      <dm:execute>http://abc.xxx/download/kmmn_win_z_update.exe</dm:execute> —813
    <dm:function>
  <dm:functions>
<dm:deviceManagement>
```

FIG.21

```
<?xml version="1.0"encoding="utf-8"?>
<dm:deviceManagement xmlns:dm="http://abc.xxx/dm/control">
  <dm:manufacturer>ABC</dm:manufacturer>           ~801
  <dm:model>Kmmn</dm:model>    ~802
  <dm:functions>  ~881
    <dm:function id="1">  ~804                                            806
      <dm:name xml:lang="en-US">Printing Preferences</dm:name>  ~805
      <dm:description xml:lang="en-US">Display the printing preferences window.</dm:description>
      <dm:icon>preferences.ico</dm:icon>  ~807
      <dm:execute>printingPreferences "ABC Kmmn"</dm:execute>  ~808
    <dm:function>
    <dm:function id="2">  ~882                                            811
      <dm:name xml:lang="en-US">Get the Latest Software</dm:name>  ~810
      <dm:description xml:lang="en-US">Get and install the latest software.</dm:description>
      <dm:icon>get.ico</dm:icon>  ~812
      <dm:required>  ~886
        <dm:keywordInRegistry key="HKLM\SOFTWARE\Microsoft\WindowsNT\CurrentVersion"
            name="CurrentVersion">6.x</dm:keywordInRegistry>  ~887
      <dm:required>
      <dm:execute>http://abc.xxx/download/kmmn_win_z_update.exe</dm:execute>  ~813
    <dm:function>
  <dm:functions>
<dm:deviceManagement>
```

880

INFORMATION PROCESSING APPARATUS, DISPLAY METHOD, AND STORAGE MEDIUM

BACKGROUND OF THE INVENTION

1. Field of the Invention

The present invention relates to an information processing apparatus, a display method, and a storage medium.

2. Description of the Related Art

A peripheral apparatus control system enables a user of an information processing apparatus to access a peripheral apparatus via an appropriate interface, such as Universal Serial Bus (USB), Ethernet®, or wireless LAN. This kind of control systems can be effectively used for various users in their houses and offices. An example of the peripheral apparatus is, for example, a printer, a copying machine, a facsimile machine, a scanner, a digital camera, or a multifunction peripheral.

Windows® 7, i.e., an operating system provided by Microsoft Corporation, includes newly introduced functions to manage peripheral apparatuses connected to an information processing apparatus, such as a personal computer (which may be referred to as "PC" in the following description). For example, the "Devices and Printers" folder is a window that displays apparatuses connected to the PC. The Device Stage® has a link function capable of displaying a link to a unique application or a service provided by each peripheral apparatus.

A "Devices and Printers" folder screen (see FIG. 5A) can be displayed when it is selected by a user on a "start menu" screen of the Windows. Further, a "Device Stage" screen (see FIG. 5B) of each peripheral apparatus can be opened when it is selected by a user from the "Devices and Printers" folder. The Device Stage can provide a visual screen that enables each user to easily access a function or a service relating to the apparatus.

A multi-function peripheral (hereinafter, referred to as "MFP") including a printer, a facsimile machine, a scanner, and a storage is an example of the peripheral apparatus. For example, it is useful to provide a task (button) on the "Device Stage" screen as a link to a web site (or a page) providing the latest software for a peripheral apparatus or an executable file.

According to the above-described example, a user can launch a web browser or a comparable application on the "Device Stage" screen to download and acquire the latest software for a peripheral apparatus (i.e., MFP). The software prepared for a peripheral apparatus is generally differentiated in binary depending on the version of an operating system (hereinafter, referred to as "OS"). In such a case, software applicable to the version of each OS is stored in a different link destination, such as a web site or a File Transfer Protocol (FTP) server.

Further, it is useful to provide a task (button) on the "Device Stage" screen as a link to open a print setting screen for a printer driver or a reading setting screen for a scanner driver. There are various on-line services available via the Internet for information processing apparatuses and peripheral apparatuses. For example, if the "Device Stage" screen provides a link to a support site on the Internet that is provided by a manufacturer of an apparatus, users can easily access an intended site relating to their apparatuses. In the following description, the "Device Stage" screen may be referred to as a device management screen. A conventional technique is discussed, for example, in Japanese Patent Application Laid-Open No. 6-67893.

It is feasible to associate a function dependent on the version of each OS with a task (button) on the "Device Stage" screen and display the task (button) on the "Device Stage" screen. For example, it is now presumed that Windows Z represents a new version of Windows 7 OS. It is further presumed that software dedicated to the Windows Z OS is downloadable from a web site and installable for a peripheral apparatus when the Windows Z OS is running on an information processing apparatus. In this case, the above-described function can be associated with a task (button) on the "Device Stage" screen so that a user can use the task (button).

However, the above-described task (button) cannot be displayed on the "Device Stage" screen if the OS running on an information processing apparatus is Windows 7. The "Device Stage" is a new function introduced for the Windows 7 OS. Therefore, the Device Stage will be available for the succeeding OS "Windows Z" although details of its framework and functions are unknown at this moment. Hence, it is presumed that a framework and functions of the Device Stage oriented to Windows Z are similar to those of the Device Stage oriented to Windows 7.

Then, it is presumed that device meta data (e.g., a device management control file), which is a constituent element of the Device Stage oriented to Windows 7, can be used for the Windows Z OS. However, the framework of the Device Stage provided by the Windows 7 OS does not include any function for switching display/non-display of a task (button) according to the version of the OS. Further, the framework of the Device Stage provided by the Windows 7 OS does not have any capability of changing the function associated with a task (button) or changing the view content of a task (button) according to the version of the OS.

Accordingly, as described above, in an information processing apparatus on which the Windows Z OS is running, software dedicated to the Windows Z OS is downloaded from a web site and installed for a peripheral apparatus. If the above-described function is provided to a user in association with a task (button) on the "Device Stage" screen, the capability of switching display/non-display of the task (button) or switching valid/invalid of the function depending on the version of the OS may not be available.

More specifically, in an information processing apparatus on which the Windows Z OS is running, the above-described task (button) is displayed on the "Device Stage" screen for validation of the function. In such a case, the task (button) can also be displayed on the "Device Stage" screen and its function becomes usable in an information processing apparatus on which the Windows 7 OS is running if the used device meta data (e.g., the device management control file) is the same.

To the contrary, in an information processing apparatus on which the Windows 7 OS is running, the above-described task (button) is not displayed on the "Device Stage" screen for invalidation of the function. In such a case, the task (button) cannot be displayed on the "Device Stage" screen and its function becomes unusable in an information processing apparatus on which the Windows Z OS is running even if the used device meta data (e.g., the device management control file) is the same.

SUMMARY OF THE INVENTION

Exemplary embodiments of the present invention are directed to a technique capable of providing a peripheral apparatus management screen that can appropriately change the display and functions according to the use environment of a user that depends on the version of an operating system.

According to an aspect of the present invention, an information processing apparatus includes a peripheral apparatus management unit. The peripheral apparatus management unit includes an acquisition function for acquiring version information of an operating system; a selection function for selecting peripheral apparatus management function control information that defines information required to construct a view content of a peripheral apparatus management screen that includes a function related object, based on the version information of the operating system acquired by the acquisition function; an installation function for installing the peripheral apparatus management function control information selected by the selection function on the information processing apparatus; and a display function for reading the peripheral apparatus management function control information installed by the installation function, constructing the view content of the peripheral apparatus management screen based on the peripheral apparatus management function control information, and displaying the peripheral apparatus management screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example configuration of a printer driver of the PC according to an exemplary embodiment of the present invention.

FIG. 8A illustrates an example of device management control file contents according to an exemplary embodiment of the present invention.

FIG. 8B illustrates an example of device management control file contents oriented to the Windows 7 OS and its successor according to an exemplary embodiment of the present invention.

FIG. 14 is a flowchart illustrating an example of web browser launching processing according to an exemplary embodiment of the present invention.

FIG. 15A illustrates an example of device management control file contents according to an exemplary embodiment of the present invention.

FIG. 15B illustrates an example of device management control file contents according to an exemplary embodiment of the present invention.

FIG. 16 is a flowchart illustrating an example of device management screen view content constructing processing according to an exemplary embodiment of the present invention.

FIG. 17A illustrates an example of device management control file contents according to an exemplary embodiment of the present invention.

FIG. 17B illustrates an example of device management control file contents according to an exemplary embodiment of the present invention.

FIG. 21 illustrates an example of device management control file contents according to an exemplary embodiment of the present invention.

DESCRIPTION OF THE EMBODIMENTS

Various exemplary embodiments, features, and aspects of the invention will be described in detail below with reference to the drawings.

Hereinafter, the description relating to the Windows® 7 Operating System is based on the information opened to the public, as of Sep. 30, 2010, on the Internet site (http://msdn.microsoft.com/en-us/library/default.aspx) of Microsoft Developer Network (MSDN) and therefore its detailed description is not repeated in the following exemplary embodiments.

In the following description, it is presumed that Windows Z represents a new version OS of the Windows® 7 OS. Further, in the context of the present disclosure, the term "USB" stands for Universal Serial Bus. The description relating to the "USB" is based on the information opened to the public, as of Nov. 5, 2009, on the Internet site (http://www.usb.org/home) of Universal Serial Bus and therefore its detailed description is not repeated in the following exemplary embodiments.

Further, in the context of the present disclosure, the term "WSD" stands for Web Services on Devices. The description relating to the "WSD" is based on the information opened to the public, as of Sep. 30, 2010, on the Internet site (http://www.microsoft.com/whdc/connect/rally/rallywsd.mspx) of Windows® Hardware Developer Central and therefore its detailed description is not repeated in the following exemplary embodiments.

An example according to a first exemplary embodiment is described below, in which a device management control file 820 oriented to the Windows 7 OS described below with reference to FIG. 8B is usable for a device even when the OS is Windows Z. However, in the example according to the first exemplary embodiment, a device management control file 800 dedicated to Windows Z is not usable for the Windows 7 OS. In this case, if the device management control file 820 oriented to the Windows 7 OS and the device management control file 800 dedicated to the Windows Z OS are present together in a state where the Windows Z OS is running on the PC, the device management control file 800 dedicated to Windows Z is prioritized. In the present exemplary embodiment, the device management control file is an example of peripheral apparatus management function control information.

Figure 1:
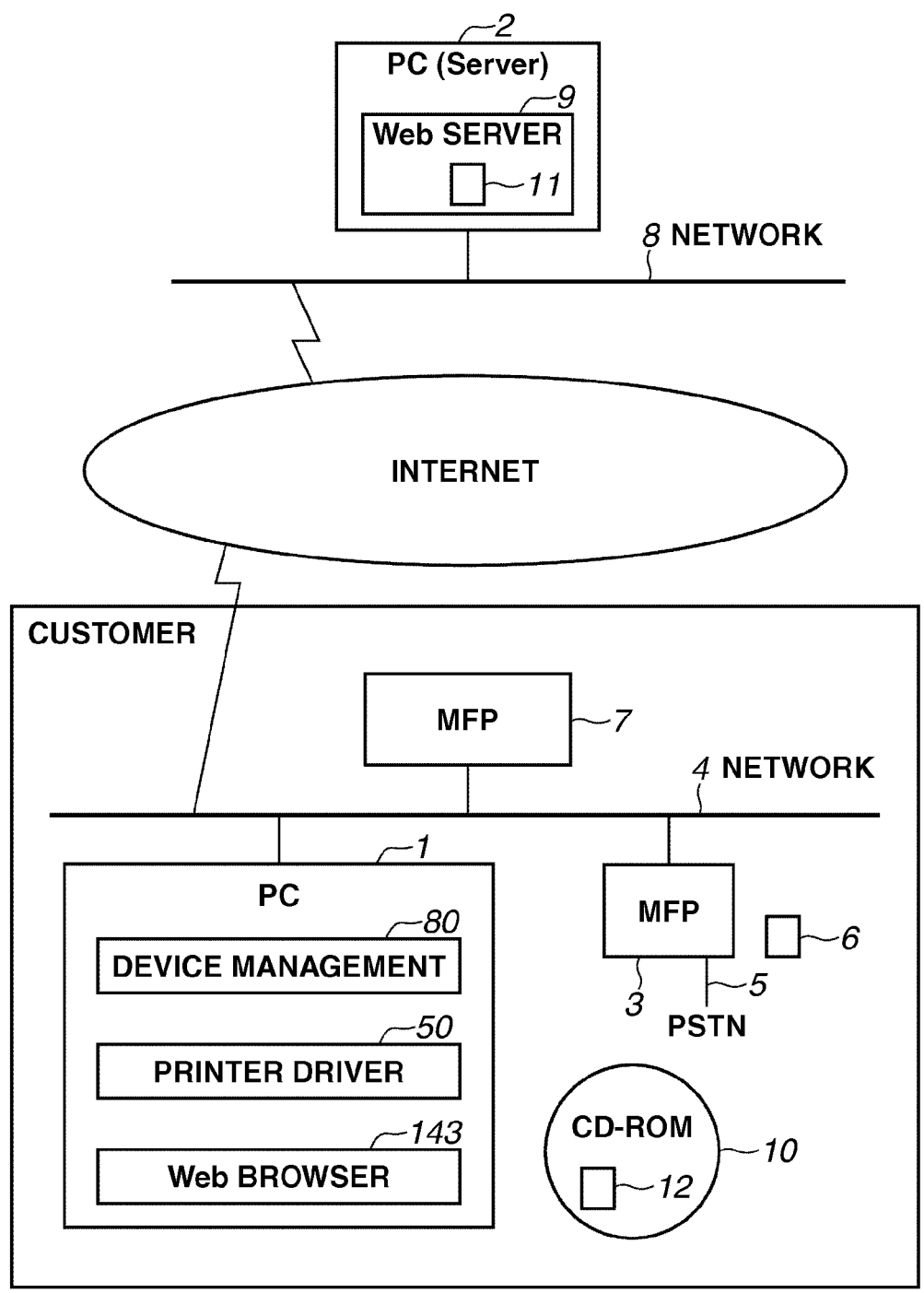
FIG. 1 illustrates an example of a system configuration of a peripheral apparatus control system that includes an information processing apparatus and a peripheral apparatus according to an exemplary embodiment of the present invention.

FIG. 1 illustrates an example of a system configuration of a peripheral apparatus control system that includes an information processing apparatus and a peripheral apparatus. The peripheral apparatus control system illustrated in FIG. 1 includes two information processing apparatuses (which may be referred to as "PC 1" and "PC 2" in the following description). The information processing apparatus can be constituted by a general personal computer (which may be referred to as "PC" in the following description).

Figure 2A:
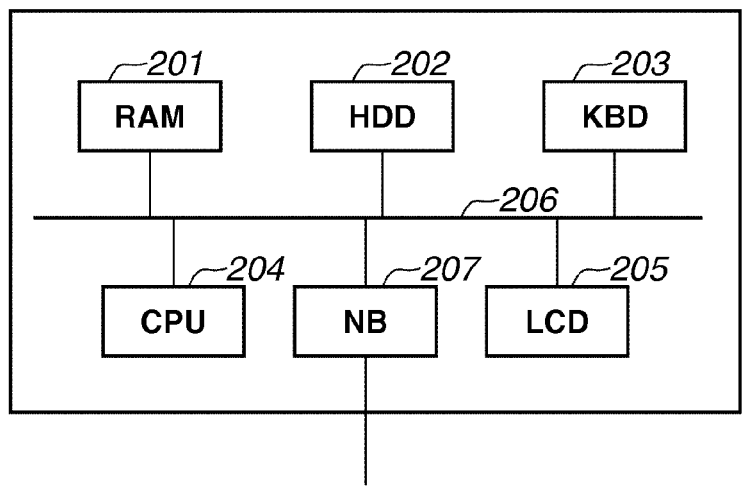
FIG. 2A illustrates an example of a hardware configuration of a personal computer (PC) according to an exemplary embodiment of the present invention.

FIG. 2A illustrates an example of a hardware configuration of each of the PC 1 and the PC 2. The Microsoft Corporation operating system, such as Windows 7 or Windows Z, or a comparable operating system (which may be referred to as "OS" in the following description) is installed on each PC.

The PC 1 and the PC 2 are connected to Ethernet® networks 4 and 8. A multi-function peripheral (hereinafter, referred to as "MFP") 3 is an example of a peripheral apparatus according to the present invention, which can be constituted by a color inkjet printer, a color facsimile machine, a color scanner, and an external storage dedicated to a flash memory. The MFP 3 is an example MFP having a model name "Kmmn", provided by ABC Corporation (i.e., a manufacturer). The peripheral apparatus according to the present invention is, for example, a printer, a copying machine, a facsimile machine, a scanner, a digital camera, or a multi-function peripheral having comparable functions.

Figure 2B:
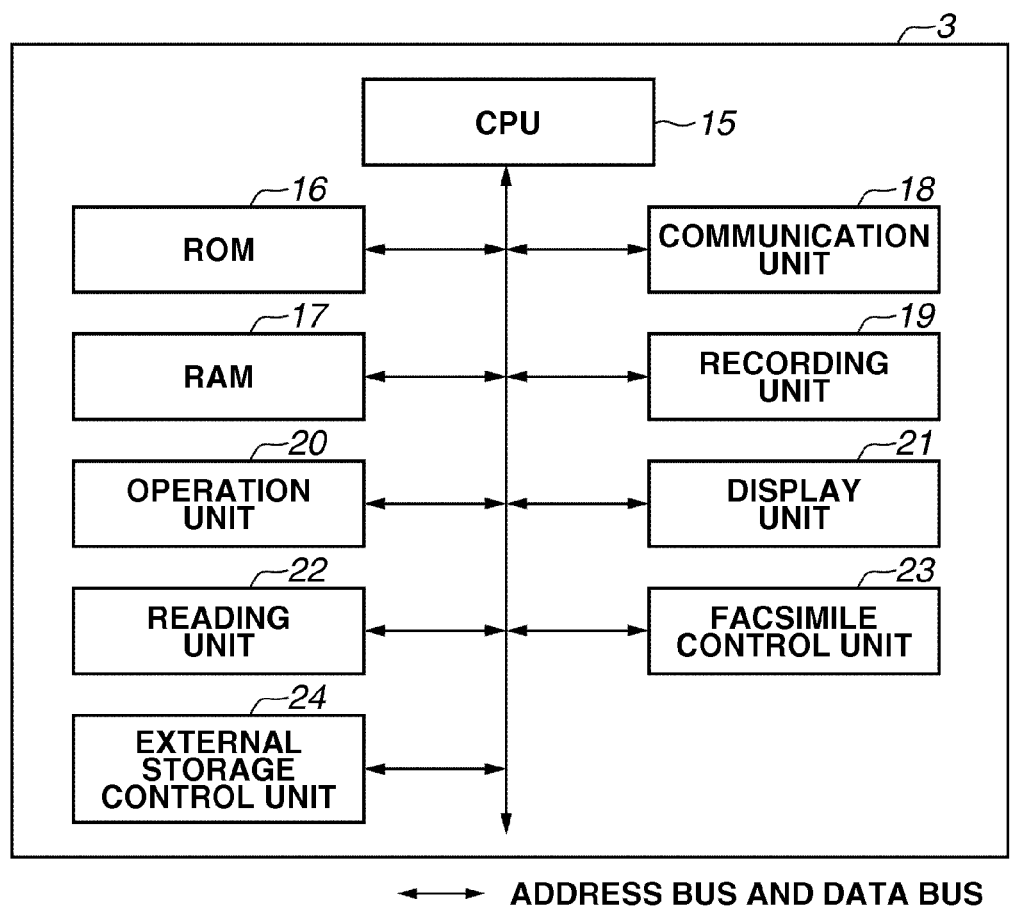
FIG. 2B illustrates an example of a hardware configuration of a multi-function peripheral (MFP) according to an exemplary embodiment of the present invention.

The MFP 3 has a hardware configuration illustrated in FIG. 2B. The MFP 3 is connected to the PC 1 via the network 4 to perform bi-directional communications. The PC 1 includes an application 80, which has a file format (*.EXE) executable by the Windows system. As an example of the application according to the present invention, the device management 80 has the capability of displaying a device management screen illustrated in FIG. 5B. The PC 1 further includes a printer driver 50 illustrated in FIG. 4 and a web browser (application) 143.

The network 4 is a home network established in a house of a user (i.e., a client) who uses the MFP 3. The MFP 3 is connected to the PC 1 via the network 4 in the house and can be commonly used by members of the family. The network 8 is an office network established in ABC Corporation.

The PC 2, which is connected to the network 8, includes a web server 9 that is functionally operable as a web server. The web server 9 provides a web site of ABC Corporation, which is accessible via the Internet. A compact disc read only memory (CD-ROM) 10 is a storage medium that can be inserted into a dedicated slot of the PC 1 and can store software (computer programs) and electronic files. The CD-ROM 10 includes a file storing unit 12. The web server 9 of the PC 2 includes a file storing unit 11.

Device management control files 800, 820, 830, 840, 850, and 870 illustrated in FIG. 15 to FIG. 17 are stored in and can be distributed from the file storing unit 11 of the web server 9 or the file storing unit 12 of the CD-ROM 10. An analog telephone line 5 is usable when the PC 1 transmits or receives facsimile data via the MFP 3. A flash memory 6 can be inserted into a flash memory slot (not illustrated) of the MFP 3. The flash memory 6 is a storage medium that can be referred to by the PC 1. A MFP 7 is another example MFP that has a model name "Defg", provided by a manufacturer "XYZ Corporation."

The device management 80 is an example of a peripheral apparatus management step. The device management screen is an example of a peripheral apparatus management screen.

FIGS. 2A and 2B are block diagrams illustrating an example of the hardware configuration applicable to the PC and the MFP. The PC 1 and the PC 2 have a hardware configuration illustrated in FIG. 2A, although FIG. 2A representatively illustrates a hardware configuration of the PC 1.

As illustrated in FIG. 2A, the PC 1 includes a random access memory (RAM) 201, a hard disk drive (HDD) 202, a keyboard (KBD) 203, and a central processing unit (CPU) 204. The PC 1 further includes a liquid crystal display (LCD) 205 and a network board (NB) 207. Further, the PC 1 includes a bus 206 via which the above-described constituent components of the PC 1 are mutually connected.

The HDD 202 is functionally operable as an example of a storage unit. The KBD 203 is functionally operable as an example of an input unit. The CPU 204 is functionally operable as an example of a control unit. The LCD 205 is functionally operable as an example of a display unit. The NB 207 is functionally operable as an example of a communication control unit. The storage unit can be a portable CD-ROM or a built-in ROM.

The CPU 204 can realize a software configuration of the PC 1 and processing illustrated in each flowchart described below when it executes processing based on a program stored in the HDD 202.

The MFP 3 has a hardware configuration illustrated in FIG. 2B. The MFP 3 illustrated in FIG. 2B includes a CPU 15, which can be constituted by a microprocessor. The CPU 15 is functionally operable as a central processing unit according to a predetermined program stored in a read only memory (ROM) 16 to control a random access memory (RAM) 17, a communication unit 18, a recording unit 19, an operation unit 20, a display unit 21, a reading unit 22, a facsimile control unit 23, and an external storage control unit 24, which cooperatively constitute the MFP 3.

The ROM 16 stores a software program relating to the control of the printer driver 50 (see FIG. 4), which causes the MFP 3 to perform recording (printing) processing and also perform processing for notifying the PC 1 of a printing operation state. Further, the ROM 16 stores a software program relating to the control of a FAX driver (not illustrated), which causes the MFP 3 to perform facsimile transmission and reception processing and also perform processing for notifying the PC 1 of a facsimile transmission or reception state.

Further, the ROM 16 stores a software program relating to the control of a WIA driver (not illustrated) or a TWAIN driver (not illustrated), which causes the MFP 3 to perform image reading processing and also perform processing for notifying the PC 1 of a reading operation state.

The RAM 17 temporarily stores print data to be printed by the recording unit 19, which is mainly transmitted from the PC 1. Further, the RAM 17 temporarily stores image data read by the reading unit 22, facsimile transmission data transmitted from the PC 1, and facsimile reception data received by the facsimile control unit 23.

The communication unit 18 includes a connection port dedicated to the network 4 and a connection port dedicated to the analog telephone line 5. The communication unit 18 can control Ethernet and facsimile analog communications. The recording unit 19 includes a recording unit and an electric circuit. The recording unit includes an inkjet type recording head, color inks, a carriage, and a recording sheet conveying mechanism. For example, the electric circuit of the recording unit 19 is an ASIC that can generate print pulses to be supplied to the recording head based on the print data.

When a user performs a printing operation or a facsimile transmission operation via an application installed on the PC 1, the view content (image data) of an opened file is temporarily stored, as an EMF format spool file, in the HDD 202 of the PC 1. Then, the spool file is converted via the printer driver 50 or the FAX driver into print data or facsimile transmission data including commands to control the MFP 3. Further, the converted data of the spool file is transmitted to the MFP 3 via the network 4.

The recording unit 19 can generate print pulses converted from the print data received by the MFP 3 and perform printing on a recording sheet based on the generated print pulses. The facsimile control unit 23 converts the facsimile transmission data received by the MFP 3 into facsimile communication protocols, and transmits the facsimile communication protocols to a destination facsimile apparatus via the analog telephone line 5. The operation unit 20 has various buttons (including a power button and a reset button) to enable users to operate the MFP 3.

The display unit 21 is constituted by a touch panel type liquid crystal display, which can display a state of the MFP 3 and enables users to input and display various settings and telephone numbers. The reading unit 22 is constituted by a color image sensor and an electric circuit constituted by an image processing ASIC. The reading unit 22 can control a scanner function of the MFP 3.

The facsimile control unit 23 is constituted by a facsimile modem and an analog communication circuit. The facsimile control unit 23 can control facsimile transmission and reception according to the facsimile communication protocols. The external storage control unit 24 is constituted by a flash memory attachment slot and a storage interface circuit, and can control an attached flash memory.

Figure 3:
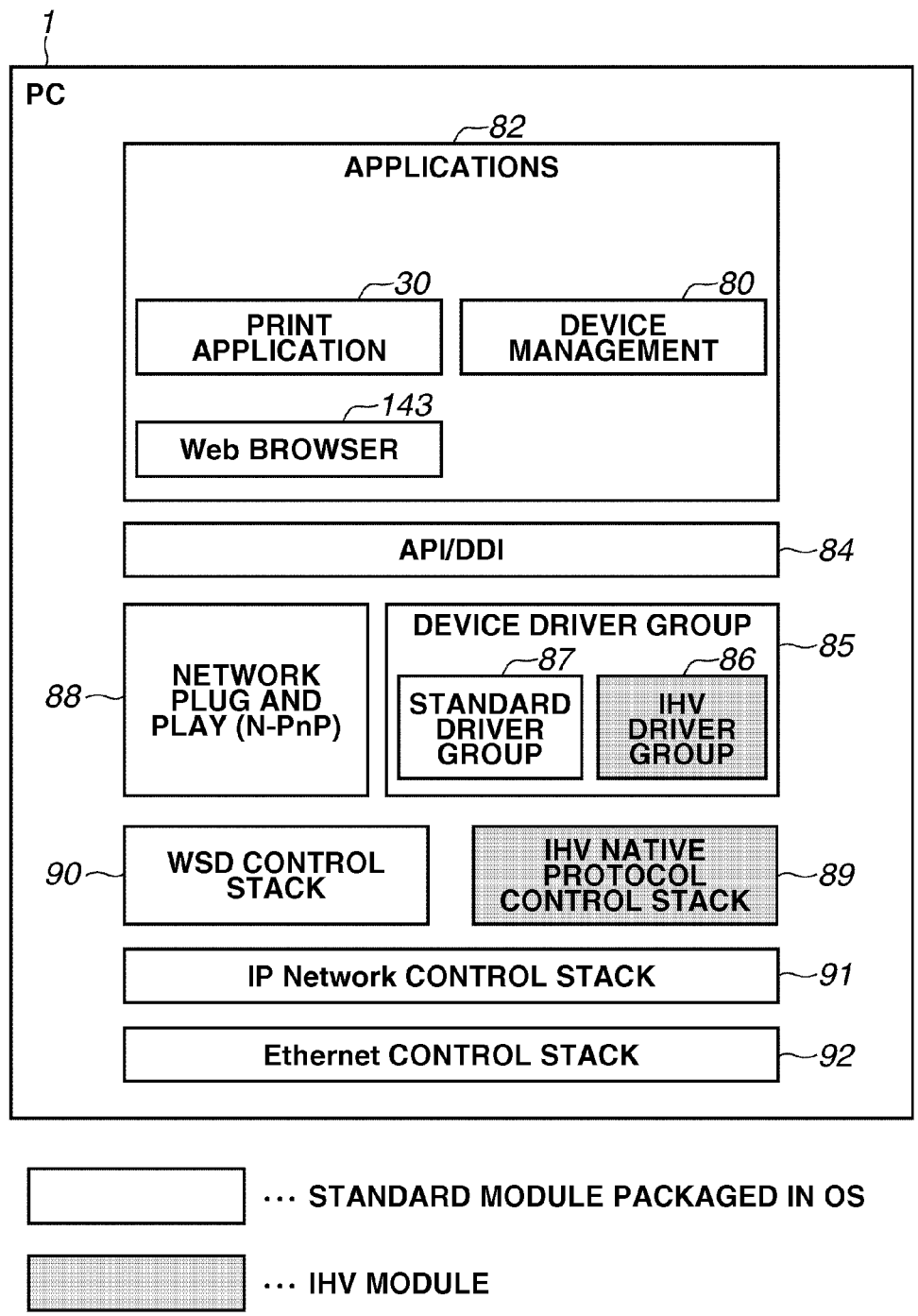
FIG. 3 illustrates an example of a software configuration of the PC according to an exemplary embodiment of the present invention.

FIG. 3 illustrates an example of a software configuration of the PC. The PC 1 illustrated in FIG. 3 includes an Ethernet control stack 92 that can control the Ethernet, and an IP Network control stack 91 that can control the IP Network. The PC 1 further includes a WSD control stack 90 that can control the WSD, an IHV native protocol control stack 89 that can control protocols of the Independent Hardware Vendor (IHV), and a N-PnP control stack 88 that can control the network Plug and Play (hereinafter, referred to as N-PnP).

Plug and Play Extensions (PnP-X), which can support a network connection device, is packaged as a standard function of the Windows 7 OS. The Plug and Play Extensions (PnP-X) is one of extension functions for the Plug and Play. In the present exemplary embodiment, the above-described N-PnP can be used as a function comparable to the Plug and Play Extensions (PnP-X).

The PC 1 further includes a device driver group 85, an application/DDI interface 84, and an application group 82. The device driver group 85 includes a standard driver group 87 packaged as standard drivers of the OS and an IHV driver group 86 provided by the Independent Hardware Vendor (IHV). The application/DDI interface 84 includes an Application Programming Interface (API) and a Device Driver Interface (DDI).

The application group 82 includes an application (Device Management) 80, which is packaged as a standard application of the OS. The application group 82 further includes a print application 30, which is described in detail below with reference to FIG. 4. The application group 82 further includes the web browser 143. The device management 80 can manage, execute, and display a "Devices and Printers" folder 500 illustrated in FIG. 5A and a device management screen 600 illustrated in FIG. 5B via the application/DDI interface 84. In the following description, the "Devices and Printers" folder 500 is simply referred to as "folder 500."

FIG. 4 illustrates an example configuration of the printer driver of the PC. The printer driver illustrated in FIG. 4 is the printer driver 50 installed on the PC 1 for the MFP 3. The printer driver 50 includes a plurality of modules (i.e., a print processor 33, a graphics driver 34, a UI module 35, a language monitor 36, and a status monitor 39).

The print application 30 is, for example, Notepad (Notepad.exe), which is packaged as a standard text editor of the OS. A Graphic Device Interface (GDI) 31 is a part of the OS. A printer queue 32 is provided, as a part of a spooler 40, for queuing of a print job. The queued print job can be displayed in a printer queue folder.

The print processor 33 can change a print layout and perform special processing on an image to be printed. The graphics driver 34 performs printer driver image processing as a core function of the image processing to be performed by the print driver. More specifically, the graphics driver 34 can process an image to be printed based on a drawing command received from the GDI 31, and can generate a print control command. The UI module 35 can provide and control a user interface of the printer driver.

The language monitor 36 is functionally operable as a data communication interface that can control data transmission/reception. The status monitor 39 can display an operational state (e.g., residual ink amount, warning, and error) of the MFP 3. A port monitor 37 can transmit data, if received from the language monitor 36, to an appropriate port. Further, the port monitor 37 can receive data from the MFP 3 via a class driver 38.

The class driver 38 is a low-level module closest to the port. In the present exemplary embodiment, the class driver 38 corresponds to a driver for a unique protocol (WSD or IHV) printer class, which controls the port (e.g., the network port in the present exemplary embodiment). The printer driver 50 is provided by ABC Corporation (i.e., the manufacturer of the MFP 3).

Figure 5A:
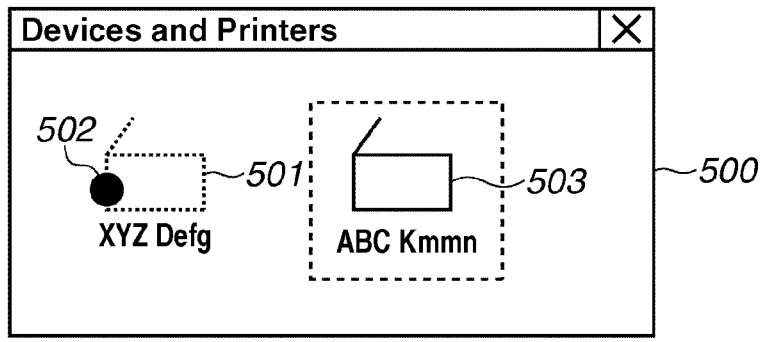
FIG. 5A illustrates an example of "Devices and Printers" folder contents according to an exemplary embodiment of the present invention.
Figure 5B:
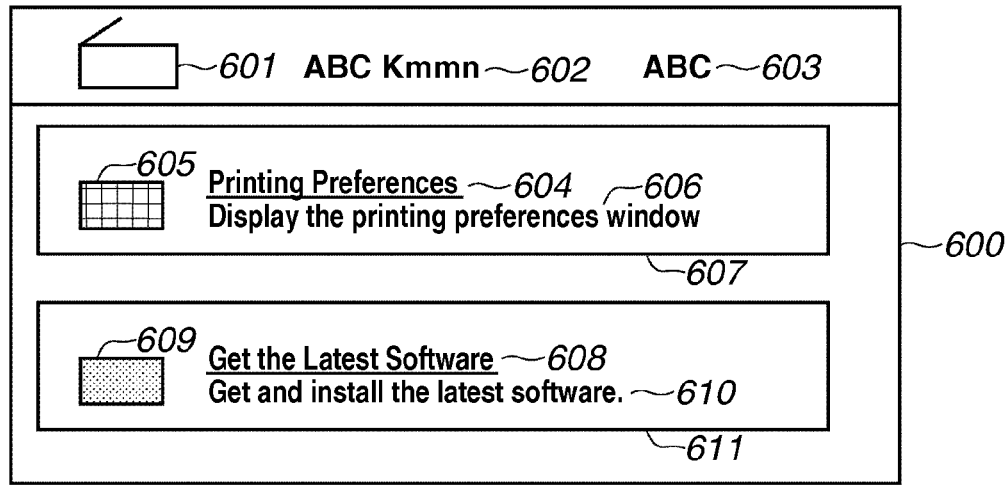
FIG. 5B illustrates an example of device management screen contents according to an exemplary embodiment of the present invention.
Figure 5C:
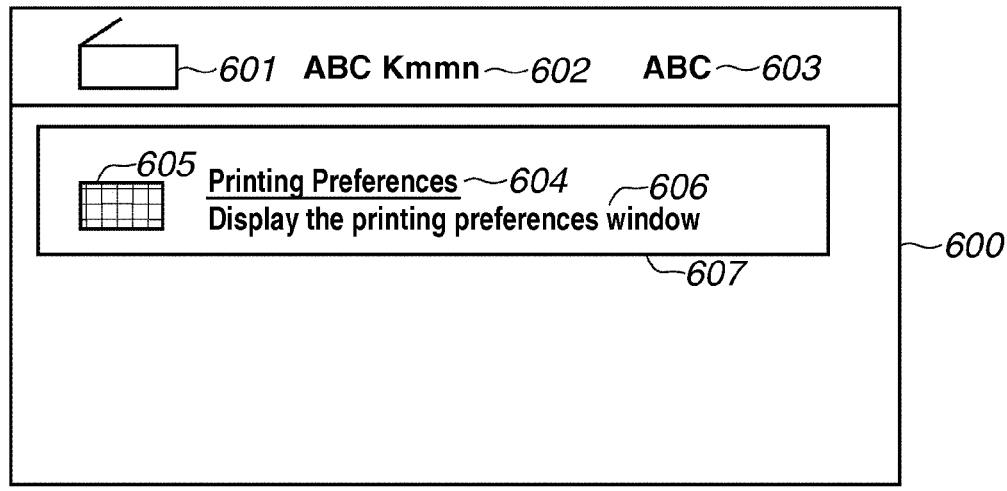
FIG. 5C illustrates an example of device management screen and the "Devices and Printers" folder contents according to an exemplary embodiment of the present invention.

FIGS. 5A to 5C illustrate examples of the "Devices and Printers" folder and the device management screen. The examples illustrated in FIGS. 5A to 5C are not limited to the present exemplary embodiment and can be similarly referred to in the following descriptions of the second exemplary embodiment, the third exemplary embodiment, and the fourth exemplary embodiment.

The "Devices and Printers" folder 500 illustrated in FIG. 5A can be displayed on the PC 1. A printer or a facsimile machine, if it is currently usable by the PC 1, is displayed for each driver in the folder 500. In the present exemplary embodiment, a device 501 named as "XYZ Defg" and a device 503 named as "ABC Kmmn" are displayed as available devices.

In the present exemplary embodiment, the device 501 displayed in the folder 500 represents the MFP 7 illustrated in FIG. 1. Further, the device 503 displayed in the folder 500 represents the MFP 3 illustrated in FIG. 1. A default mark 502 is put on a default device of the system. In the state illustrated in FIG. 5A, the device 501 is the default device.

In the "Devices and Printers" folder 500, the device 501 is in an unusable state because the line type of an icon representing the device 501 is a dotted line. On the other hand, the device 503 is in a usable state because the line type of an icon representing the device 503 is a solid line.

The device management screen 600 illustrated in FIG. 5B can be launched and displayed in response to a selection of the device 503 in the "Devices and Printers" folder 500 illustrated in FIG. 5A. The device management screen 600 can be used to manage the MFP 3. Items displayed at an upper part of the device management screen 600 are a device icon 601, a device name 602, and manufacturer information 603. Data of the device icon 601 is stored as apart of a device management control file storing unit 905 (not illustrated).

Further, information displayed in the field of the device name 602 is the device name of the device 503 stored in the "Devices and Printers" folder 500. Further, information displayed in the field of the manufacturer information 603 is a character string designated in a <dm:manufacturer> element 801. Items displayed at a lower part of the device management screen 600 are links to functions relating to the device 503.

More specifically, a print setting button 607 and a Windows Z software acquisition button 611 are displayed in the lower part of the device management screen 600. The print setting button 607 includes a button name 604, an icon 605, and a button explanation 606. The Windows Z software acquisition button 611 includes a button name 608, an icon 609, and a button explanation 610.

FIG. 5B illustrates an example of the device management screen 600, in which the print setting button 607 of ID1 and the Windows Z software acquisition button 611 of ID2 are both displayed. The print setting button 607 and the Windows Z software acquisition button 611 are example objects.

FIG. 5C includes contents already described in FIG. 5B and therefore the descriptions thereof are not repeated. As apparent from the comparison between FIG. 5C and FIG. 5B, the device management screen 600 illustrated in FIG. 5C does not include the Windows Z software acquisition button 611 illustrated in FIG. 5B. Accordingly, the Windows Z software for the device (i.e., the MFP 3) named as "Kmmn" of ABC Corporation cannot be acquired from the device management screen 600 illustrated in FIG. 5C.

The device management screen 600 illustrated in FIG. 5C is the screen to be displayed when the OS running on the PC 1 is Windows 7. As described below with reference to FIG. 15A, FIG. 15B, FIG. 17A, and FIG. 17B, <dm:function> elements 804, 809, 832, 842, 852, and 872 indicating button and function information of the device management screens 600 illustrated in FIGS. 5B and 5C are described in <dm:functions> elements 803, 821, 831, 841, 851, and 871.

Figure 6:
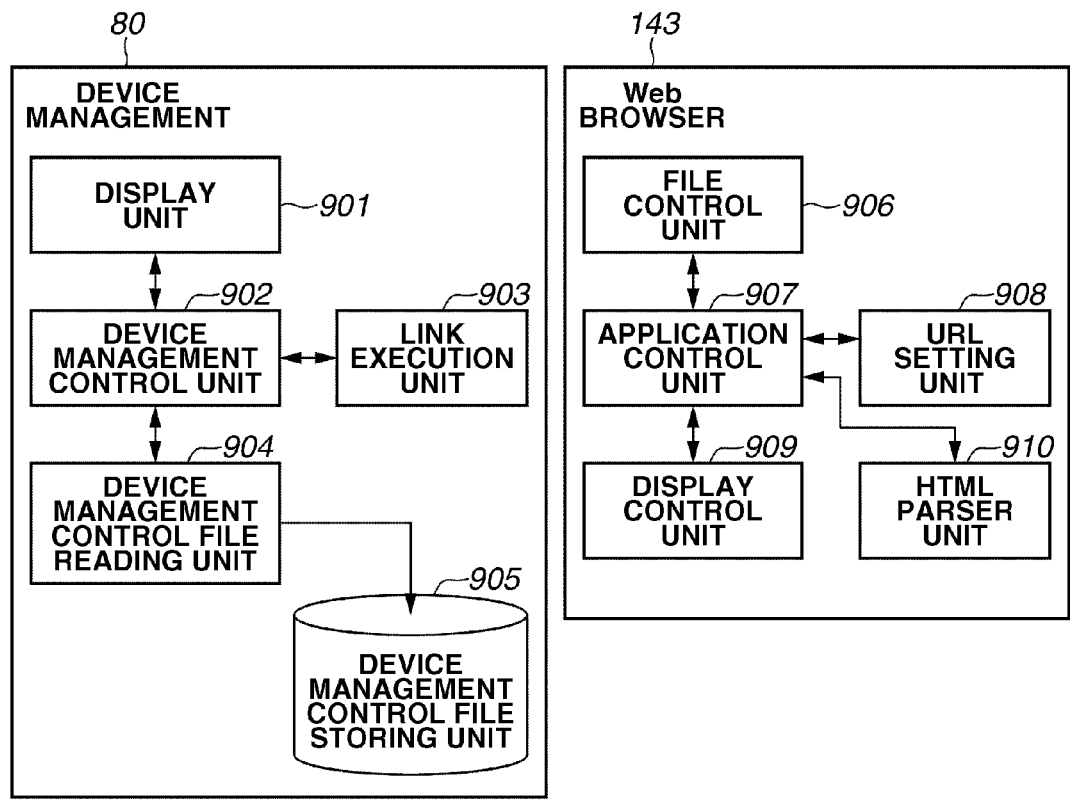
FIG. 6 illustrates an example of a software configuration of a device management and a web browser according to an exemplary embodiment of the present invention.

FIG. 6 illustrates an example of a software configuration including the device management 80 and the web browser 143. In FIG. 6, the device management 80 includes a display unit 901, a device management control unit 902, a link execution unit 903, a device management control file reading unit 904, and a device management control file storing unit 905. The device management control file (i.e., the device management control file 800 in the first exemplary embodiment) stored in step S1405 of FIG. 10 can be stored in the device management control file storing unit 905.

The web browser 143 includes a file control unit 906, an application control unit 907, a Locator (URL) setting unit 908, a display control unit 909, and a HyperText Markup Language (HTML) parser unit 910. The file control unit 906 is a module capable of controlling a file that the web browser 143 can download or upload. The URL setting unit 908 is a module capable of setting a URL that the web browser 143 can access. The display control unit 909 is a module capable of controlling the display to be performed by the web browser 143.

The HTML parser unit 910 is a module capable of analyzing an HTML file of a web site (page) designated by URL having been set by the URL setting unit 908 and determining a layout of the web site (page). The application control unit 907 is a module capable of controlling the entire application that the web browser 143 can execute. The application control unit 907 can control operations to be performed by the file control unit 906, the URL setting unit 908, the display control unit 909, and the HTML parser unit 910.

The device management screen 600 can be launched and displayed when the MFP 3 is connected to the PC 1 via the network 4. The device management screen 600 can be launched and displayed in response to a selection of a device in the "Devices and Printers" folder 500 illustrated in FIG. 5A. In the following description, it is assumed that the device management screen 600 illustrated in FIG. 5B or 5C can be launched and displayed when the MFP 3 is connected to the PC 1 via the network 4.

Figure 7A:
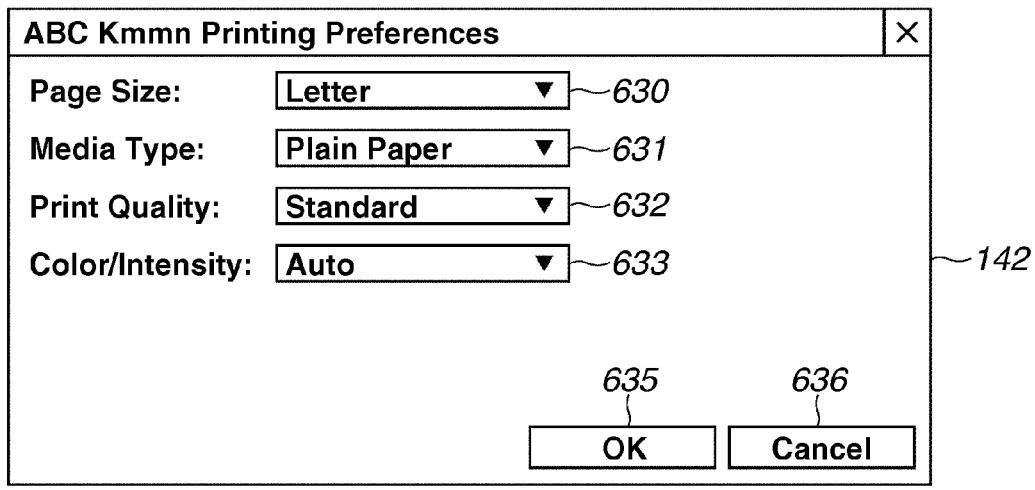
FIG. 7A illustrates an example of a print setting screen of the printer driver according to an exemplary embodiment of the present invention.
Figure 7B:
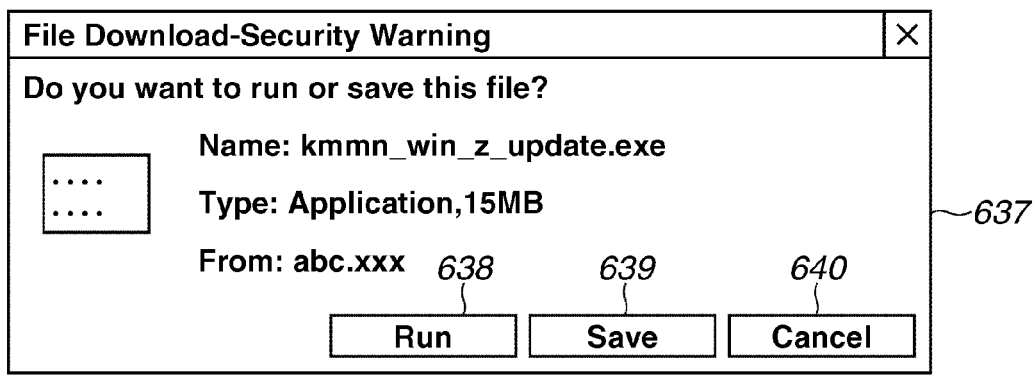
FIG. 7B illustrates an example of a file download screen of the web browser according to an exemplary embodiment of the present invention.
Figure 7C:
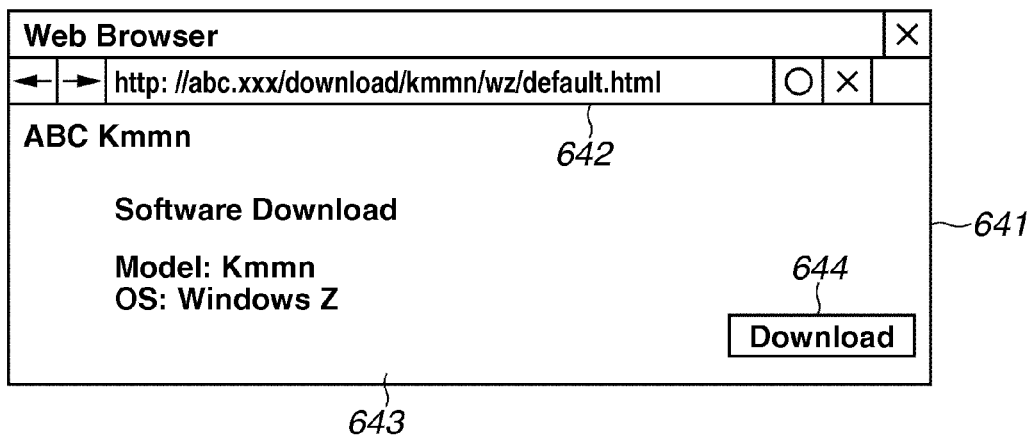
FIG. 7C illustrates an example of a main screen of the web browser according to an exemplary embodiment of the present invention.

FIGS. 7A, 7B, and 7C illustrate examples of a print setting screen of the printer driver, a file download screen of the web browser, and a main screen of the web browser. FIG. 7A illustrates a print setting screen 142 of the printer driver. In the print setting screen 142 illustrated in FIG. 7A, the UI module 35 of the printer driver 50 controls the print setting screen 142 as a print setting screen for the MFP 3.

The print setting screen 142 includes a sheet size selection field 630, which enables each user to select a desired sheet size from the following items having been set beforehand for the MFP 3. According to the example illustrated in FIG. 7A, the selected sheet size is "Letter."
Items Selectable as Sheet Size:
A5
A4
B5
Letter The print setting screen 142 includes a media type selection field 631, which enables each user to select a desired sheet type from the following items having been set beforehand for the MFP 3. According to the example illustrated in FIG. 7A, the selected sheet type is "Plain Paper."
Items Selectable as Sheet Type:
Plain Paper
Photo Paper
Postcard The print setting screen 142 includes a print quality selection field 632, which enables each user to select a desired print quality from the following items having been set beforehand for the MFP 3. According to the example illustrated in FIG. 7A, the selected print quality is "Standard."
Items Selectable as Print Quality:
High
Standard
Fast The print setting screen 142 includes a color/intensity selection filed 633, which enables each user to select desired color and density from the following items having been set beforehand for the MFP 3. According to the example illustrated in FIG. 7A, the selected color/intensity is "Auto."
Items Selectable as Print Quality:
Auto
Manual The print setting screen 142 includes an OK button 635. If the OK button 635 is pressed by a user, the UI module 35 stores all of the selected print settings and closes the print setting screen 142. The print setting screen 142 includes a cancel button 636. If the cancel button 636 is pressed by a user, the UI module 35 closes the print setting screen 142. When the cancel button 636 is pressed, the UI module 35 does not store any one of the selected print settings.

FIG. 7B illustrates an example of a file download screen 637 of the web browser 143. The display control unit 909 displays the file download screen 637 if the web browser 143 is launched when an executable format file is designated as launching URL or if the web browser 143 is linked when an executable format file is designated as a link destination URL.

The file download screen 637 includes a run button 638. If the run button 638 is pressed by a user, the file control unit 906 executes an executable format file that is designated by the URL. The file download screen 637 further includes a save button 639. If the save button 639 is pressed by a user, the file control unit 906 instructs the display control unit 909 to display a file storage screen (not illustrated) so that an executable format file designated by the URL can be stored via the file storage screen. The file download screen 637 includes a cancellation button 640. If the cancellation button 640 is pressed by a user, the display control unit 909 closes the file download screen 637. When the cancellation button 640 is pressed, the file control unit 906 does not execute or does not store any executable format file designated by the URL.

According to a state illustrated in FIG. 7B, http://abc.xxx/download/kmmn_win_z_update.exe is executed and download of kmmn_win_z_update.exe file is immediately started. Windows Z software for a device (i.e., the MFP 3) named as "Kmmn" of ABC Corporation is incorporated in the kmmn_win_z_update.exe file. When the kmmn_win_z_update.exe file is executed, the device oriented Windows Z software can be installed on the PC (i.e., the PC 1).

FIG. 7C illustrates an example of a main screen 641 of the web browser 143. If the web browser 143 is launched by a user, or if a page designated by the URL is linked via the web browser 143, the display control unit 909 displays the main screen 641. The main screen 641 includes a URL designation field 642 and a page display field 643. If a user designates the URL of a web site (page) in the URL designation field 642, the URL setting unit 908 sets the designated URL. Then, the application control unit 907 acquires the URL. Then, the display control unit 909 displays a web site (page) designated by the URL in the page display field 643.

Further, when the web browser 143 is launched in response to a designation of the URL of web site (page) as a launching argument, or when a page designated by the URL is linked from the web browser 143, the display control unit 909 displays the URL designated in the URL designation field 642.

According to a state illustrated in FIG. 7C, the URL designated as a launching argument is http://abc.xxx/download/kmmn/wz/default.html and the web browser 143 has been launched. The URL illustrated in FIG. 7C indicates a download page of the Windows Z software applicable to the device (i.e., the MFP 3) named as "Kmmn" of ABC Corporation. The page displayed in FIG. 7C is the download page of the Windows Z software.

The main screen 641 further includes a download button 644. A link destination allocated to the download button 644 is the URL "http://abc.xxx/download/kmmn_win_z_update.exe." If the download button 644 is pressed by a user, the display control unit 909 displays the file download screen 637. The above description for FIG. 7B can be similarly applied to the rest of the user operation.

FIG. 8A and FIG. 8B illustrate examples of the device management control file contents. Information illustrated in FIG. 8A and FIG. 8B, i.e., the device management control files 800 and 820, is stored in the file storing unit 11 or 12. FIG. 8A illustrates an example of the content of the device management control file 800 dedicated to the Windows Z OS.

The device management control file 800 illustrated in FIG. 8A includes a <dm:availableOS> element 814 that includes a setting of Windows Z as version information of the OS that can use the device management control file 800. It is understood from the OS version information having been set that the device management control file 800 can be used when the OS is Windows Z.

The <dm:manufacturer> element 801 includes a setting of ABC Corporation, which is a manufacturer name of the device (i.e., the MFP 3). A <dm:model> element 802 includes a setting of Kmmn, which is a model name of the device (i.e., the MFP 3). The above-described information can be used in installation of the device management control file 800.

Further, the device management control file 800 includes information required to constitute the device management screen 600. More specifically, the device management control file 800 includes a definition of information required to construct a view content of the device management screen 600.

The <dm:functions> element 803 includes a setting relating to <dm:function> elements 804 and 809 that indicate button and function information respectively required to display "the print setting button 607 and the Windows Z software acquisition button 611" illustrated in FIG. 5B, on the device management screen 600 launched and displayed when the MFP 3 is connected to the PC 1, when the OS currently running on the PC 1 is Windows Z.

The <dm:function> element 804 includes an attribute id="1", which indicates that the ID of the button is 1. A <dm:name xml:lang="en-US">Printing Preferences</dm:name> element 805 includes a setting of an English character string "Printing Preferences" to be displayed in the field of the button name 604 that partly constitutes the print setting button 607 of ID1.

A <dm:description xml:lang="en-US">Display the printing preferences window.</dm:description> element 806 includes a setting of an English character string "Display the printing preferences window." to be displayed in the field of the button explanation 606 that partly constitutes the print setting button 607 of ID1. A <dm:icon>preferences.ico</dm:icon> element 807 includes a setting of an icon file "preferences.ico" to be displayed in the field of the icon 605 that partly constitutes the print setting button 607 of ID1.

A <dm:execute>printingPreferences "ABC Kmmn"</dm:execute> element 808 includes a code setting of printingPreferences "ABC Kmmn", which indicates a function (program) capable of displaying the print setting screen 142. In the present exemplary embodiment, "ABC Kmmn" is an argument to be used to designate the print setting screen 142 for the MFP 3.

The <dm:function> element 809 includes an attribute id="2", which indicates that the ID of the button is 2. A <dm:name xml:lang="en-US">Get the Latest Software</dm:name> element 810 includes a setting of an English character string "Get the Latest Software" to be displayed in the field of the button name 608 that partly constitutes the Windows Z software acquisition button 611 of ID2.

A <dm:description xml:lang="en-US">Get and install the latest software.</dm:description> element 811 includes a setting of an English character string "Get and install the latest software." to be displayed in the field of the button explanation 610 that partly constitutes the Windows Z software acquisition button 611 of ID2.

A <dm:icon>get.ico</dm:icon> element 812 includes a setting of an icon file "get.ico" to be displayed in the field of the icon 609 that partly constitutes the Windows Z software acquisition button 611 of ID2. A <dm:execute>http://abc.xxx/download/kmmn_win_z_update.exe</dm:execute> element 813 includes a setting of the URL "http://abc.xxx/download/kmmn_win_z_update.exe", which can be accessed by the launched web browser 143 to download a kmmn_win_z_update.exe file that incorporates Windows Z software applicable to the device (i.e., the MFP 3) named as "Kmmn" of ABC Corporation.

FIG. 5B illustrates an example case where a view content of the device management screen 600 is constructed according to a processing flow described below with reference to FIG. 13A and, as a result, the print setting button 607 of ID1 and the Windows Z software acquisition button 611 of ID2 are displayed. When the print setting button 607 of ID1 is displayed on the device management screen 600, if the print setting button 607 is pressed by a user, the print setting screen 142 for the MFP 3 can be launched and the print setting screen 142 illustrated in FIG. 7A can be displayed.

When the Windows Z software acquisition button 611 of ID2 is displayed on the device management screen 600, if the button 611 is pressed by a user, the web browser 143 can be launched according to a processing flow described below with reference to FIG. 14. Further, the file download screen 637 of the web browser 143 can be displayed to enable the user to download the kmmn_win_z_update.exe file illustrated in FIG. 7B.

FIG. 8B illustrates an example of the content of the device management control file 820 oriented to the Windows 7 OS (or a succeeding OS). In a state where both of the device management control files 800 and 820 are stored in the file storing unit 11 or 12, if the Windows Z OS is currently running on the PC 1, the device management control file 800 can be installed on the PC 1 and can be used by the PC 1. In FIG. 8B, the contents already described with reference to FIG. 8A are using the same reference numbers and the descriptions thereof are not repeated.

The device management control file 820 illustrated in FIG. 8B does not include any version information of the usable OS that can use the device management control file 820. In the present exemplary embodiment, the version information of the usable OS is, for example, the <dm:availableOS> element 814 of the device management control file 800 illustrated in FIG. 8A. In other words, it means that the device management control file 820 is commonly usable for Windows 7 and its successor. However, when the OS is Windows Z, as described below with reference to a processing flow described below with reference to FIG. 11, the usage of the device management control file 800 is prioritized if the device management control file 800 dedicated to the Windows Z OS is present.

In FIG. 8B, the <dm:manufacturer> element 801 and the <dm:model> element 802 include setting relating to information that can be used in the installation of the device management control file 820. Further, the device management control file 820 includes information required to constitute the device management screen 600. For example, the device management control file 820 includes the <dm:functions> element 821, which includes a setting relating to the <dm:function> element 804 indicating the button and function information required to display "the print setting button 607" illustrated in FIG. 5C on the device management screen 600 to be launched and displayed, if the OS currently running on the PC 1 is Windows 7 when the MFP 3 is connected to the PC 1.

FIG. 5C illustrates an example case where a view content of the device management screen 600 is constructed according to a processing flow described below with reference to FIG. 13B and, as a result, the print setting button 607 of ID1 is displayed. When the print setting button 607 of ID1 is displayed on the device management screen 600, if the print setting button 607 is pressed by a user, the print setting screen 142 for the MFP 3 can be launched and the print setting screen 142 illustrated in FIG. 7A can be displayed.

Figure 9:
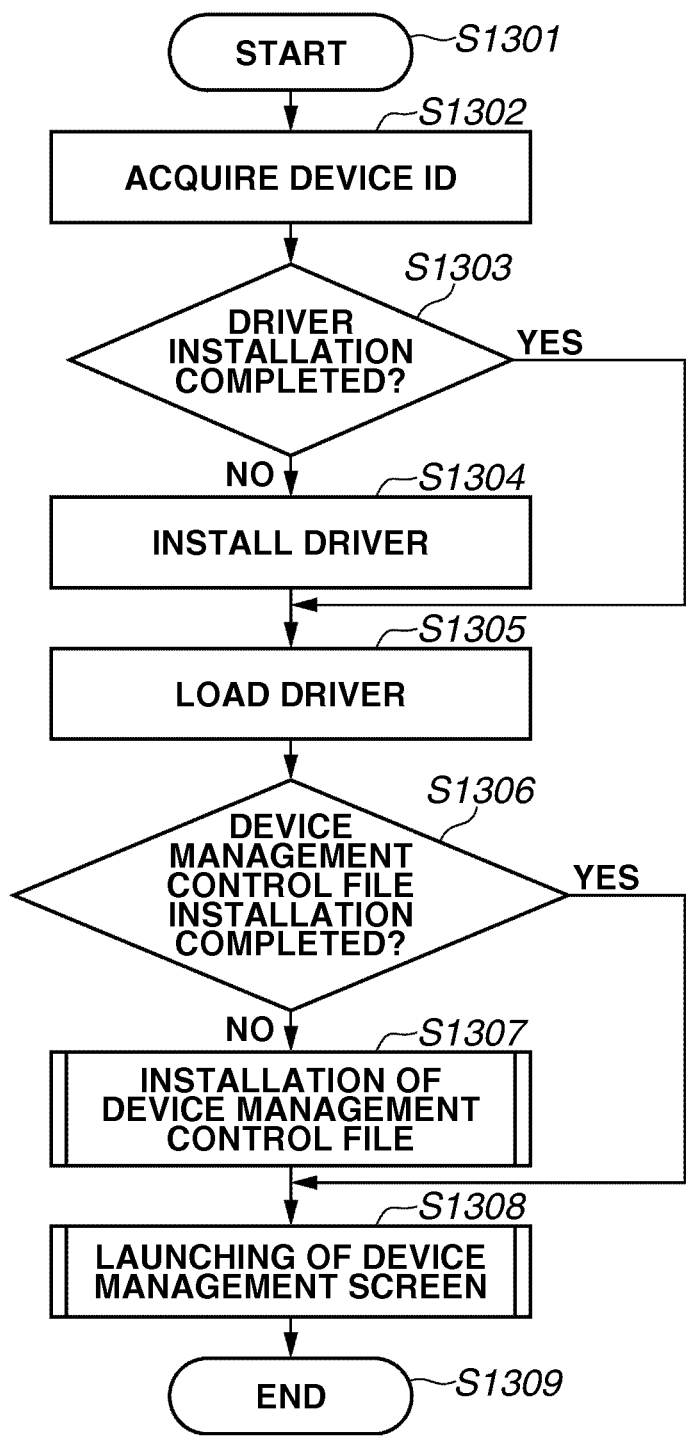
FIG. 9 is a flowchart illustrating an example of device connection processing according to an exemplary embodiment of the present invention.

FIG. 9 is a flowchart illustrating an example of device connection processing. The processing content of the flowchart illustrated in FIG. 9 is not limited to the present exemplary embodiment and can be similarly referred to in the following descriptions of the second exemplary embodiment, the third exemplary embodiment, and the fourth exemplary embodiment.

If in step S1301 the device (i.e., the MFP 3) is connected to the PC (i.e., the PC 1) via the network 4, then in step S1302, the PC 1 acquires a device ID. For example, "MFG:ABC; MDL:Kmmn;CLS:PRINTER;CMD:K4;DES:ABC Kmmn;" is an example of the device ID that is expressed using a character string. The above-described device ID includes the following information relating to a printer function of the MFP 3 that the PC 1 can acquire from the MFP 3 via the network 4.

Manufacturer (MFG:): ABC
Model (MDL:): Kmmn
Class (CLS:): PRINTER
Command (CMD:): K4 (ABC Corporation private print control command)
Description (DES:): ABC Kmmn Next, in step S1303, the device management 80 determines whether various types of drivers (e.g., the printer driver 50, the FAX driver (not illustrated), and the scanner driver (not illustrated) have been already installed on the PC 1. In the following description of FIG. 9, the various types of drivers (e.g., the printer driver 50, the FAX driver, and the scanner driver) are simply referred to as "drivers."

If it is determined that the drivers are not yet installed (NO in step S1303), then in step S1304, the OS installs the drivers. Subsequently, in step S1305, the OS loads the drivers. If the loading of the drivers is correctly completed, the system is brought into a state where the device (i.e., the MFP 3) is registered in the folder 500 illustrated in FIG. 5A.

In step S1306, the device management 80 determines whether any one of the device management control files 800, 820, 830, 840, 850, and 870 illustrated in FIG. 15A, FIG. 15B, FIG. 17A, and FIG. 17B has been already installed on the PC 1. The determination processing in step S1306 includes determining whether the installed device management control file is compatible with the driver based on the manufacturer (MFG:) information and the model (MDL:) information included in the device ID.

If it is determined that the device management control file is not yet installed (NO in step S1306), then in step S1307, the device management 80 executes device management control file installation processing, which is described in detail below with reference to FIG. 10. Then, in step S1308, the device management 80 executes device management screen launching processing, which is described in detail below with reference to FIG. 12. Then, in step S1309, the device management 80 terminates the device connection processing.

If it is determined that anyone the device management control files is already installed (YES in step S1306), the processing directly proceeds to step S1308. Further, if it is determined that the drivers are already installed (YES in step S1303), the processing directly proceeds to step S1305.

Figure 10:
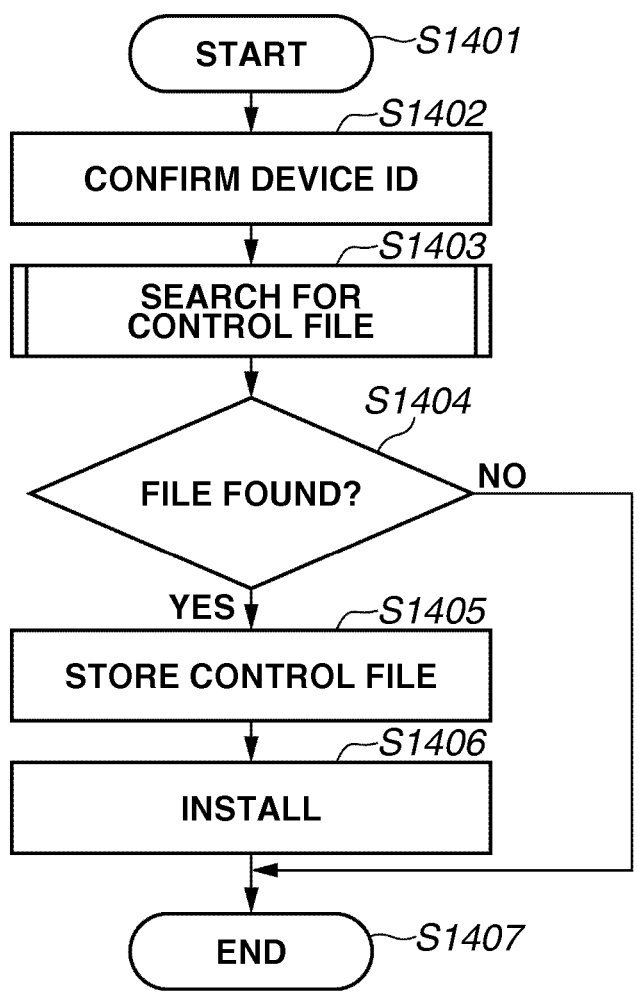
FIG. 10 is a flowchart illustrating an example of device management control file installation processing according to an exemplary embodiment of the present invention.

FIG. 10 is a flowchart illustrating an example of the device management control file installation processing. The processing content of the flowchart illustrated in FIG. 10 is not limited to the present exemplary embodiment and can be similarly referred to in the following descriptions of the second exemplary embodiment, the third exemplary embodiment, and the fourth exemplary embodiment.

If the device management control file installation processing is executed in step S1307 illustrated in FIG. 9, then in step S1401 illustrated in FIG. 10, the device management 80 starts device management control file installation processing. First, in step S1402, the device management 80 confirms a device ID of a device (i.e., the MFP 3) connected via the network 4.

Figure 11:
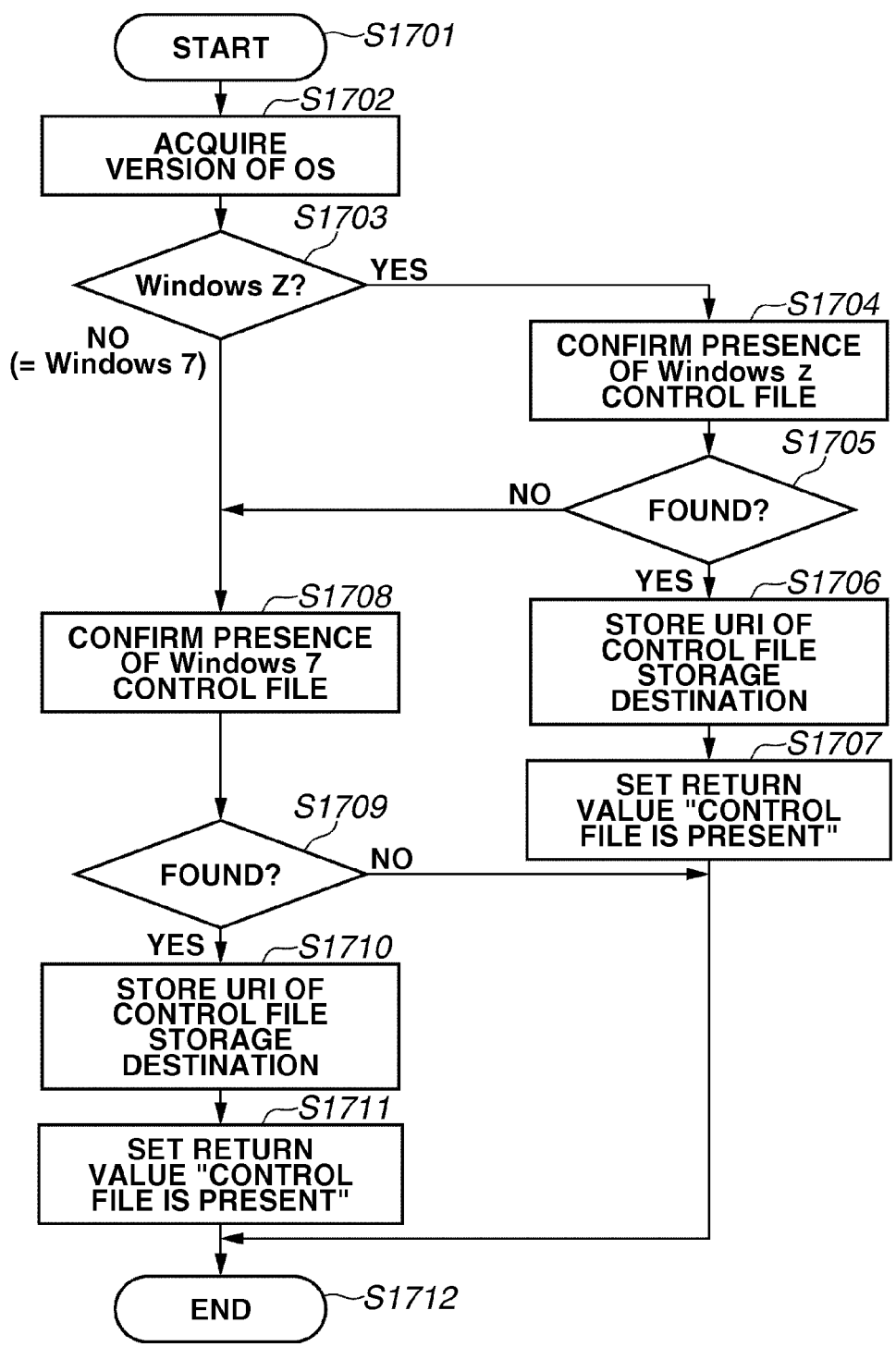
FIG. 11 is a flowchart illustrating an example of control file search processing according to an exemplary embodiment of the present invention.

In step S1403, the device management 80 executes control file search processing illustrated in FIG. 11 based on the manufacturer (MFG:) information and the model (MDL:) information included in the device ID, to search for the device management control files 800, 820, 830, 840, 850, and 870 applicable to the device (i.e., the MFP 3) connected to the PC 1 illustrated in FIG. 15A, FIG. 15B, FIG. 17A, and FIG. 17B.

In step S1404, the device management 80 determines whether a device management control file has been found from the file storing unit 11 or 12. If it is determined that the device management control file has been found (YES in step S1404), then in step S1405, the device management 80 stores the detected device management control file in a predetermined area (i.e., the device management control file storing unit 905) in the HDD 202 of the PC 1.

Then, in step S1406, the device management 80 installs the detected device management control file (the processing in step S1406 can be referred to as "installation function"). If the installation of the device management control file is completed, then in step S1407, the device management 80 terminates the device management control file installation processing.

In the first exemplary embodiment, it is presumed that the device management control file detected in step S1404 is the device management control file 800 corresponding to the device (i.e., the MFP 3). Further, in step S1405, the device management control file 800 is stored in a predetermined area in the HDD 202 of the PC 1. Then, in step S1406, the device management control file 800 is installed.

If it is determined that there is not any device management control file having been found (NO in step S1404), then in step S1407, the device management 80 terminates the device management control file installation processing without installing any device management control file.

FIG. 11 is a flowchart illustrating an example of the control file search processing. The processing content of the flowchart illustrated in FIG. 11 is not limited to the present exemplary embodiment and can be similarly referred to in the following descriptions of the second exemplary embodiment, the third exemplary embodiment, and the fourth exemplary embodiment.

If the control file search processing is executed in step S1403 illustrated in FIG. 10, then in step S1701 illustrated in FIG. 11, the device management 80 starts the control file search processing. In this case, the device management 80 sets a return value "the device management control file is not present" and initializes the return value.

In step S1702, the device management control unit 902 acquires version information of the OS using the GetOSVersion function (the processing in step S1702 can be referred to as "acquisition function"). In the present exemplary embodiment, to simplify the description, it is now presumed that the return value of the above-described function is "Windows 7" when the OS is Windows 7 and "Windows Z" when the OS is Windows Z.

If the device management control unit 902 determines that the OS is Windows Z (YES in step S1703), the processing proceeds to step S1704. If the device management control unit 902 determines that the OS is not Windows Z, namely when the OS is Windows 7 (NO in step S1703), the processing proceeds to step S1708.

In step S1704, the device management 80 searches the file storing units 11 and 12 to confirm the presence of the device management control file oriented to the Windows Z OS. If the device management 80 has found the device management control file oriented to the Windows Z OS (i.e., the device management control file 800 dedicated to Windows Z in the first exemplary embodiment) (YES in step S1705), the processing proceeds to step S1706.

On the other hand, if the device management 80 has not found the device management control file oriented to the Windows Z OS (NO in step S1705), the processing proceeds to step S1708. In step S1706, the device management 80 stores URI information relating to a storage destination of the device management control file found in step S1705 (i.e., the device management control file 800 in the first exemplary embodiment) (the processing in step S1706 can be referred to as "selection function"). Then, in step S1707, the device management 80 sets a return value "the device management control file is present." The processing proceeds to step S1712. In the present exemplary embodiment, URI stands for Uniform Resource Identifier.

In step S1708, the device management 80 searches the file storing units 11 and 12 to confirm the presence of the device management control file oriented to Windows 7. If the device management 80 has found the device management control file oriented to Windows 7 (i.e., the device management control file 820 in the first exemplary embodiment) (YES in step S1709), the processing proceeds to step S1710. If the device management 80 has not found any device management control file oriented to Windows 7 (NO in step S1709), the processing proceeds to step S1712.

In step S1710, the device management 80 stores URI information relating to a storage destination of the device management control file found in step S1709 (i.e., the device management control file 820 in the first exemplary embodiment) (the processing in step S1710 can be referred to as "selection function"). Then, in step S1711, the device management 80 sets a return value "the device management control file is present." The processing proceeds to step S1712.

In step S1712, the device management 80 sends the URI information stored in step S1706 or S1710, as an argument, to the caller of the processing. Further, the device management 80 sends the value set in the return value to the caller of the processing. Then, the device management 80 terminates the control file search processing and returns to the caller of the processing.

Details of the processing in steps S1704 and S1708, i.e., the search processing and the confirmation processing of the device management control file, can be performed in the following manner. The device management control files 800, 820, 830, 840, 850, and 870 illustrated in FIGS. 15A and 15B to FIGS. 17A and 17B include the <dm:manufacturer> element 801 describing the manufacturer (MFG:) "ABC" of the device (i.e., the MFP 3) and the <dm:model> element 802 describing the model (MDL:) "Kmmn."

In steps S1704 and S1708, the device management 80 searches for the device management control files 800, 820, 830, 840, 850, and 870 applicable to the device (i.e., the MFP 3) from the file storing unit 11 of the web server 9 or the file storing unit 12 in the CD-ROM 10 inserted in the PC 1 based on the information described in the element 801 and the element 802.

Figure 12:
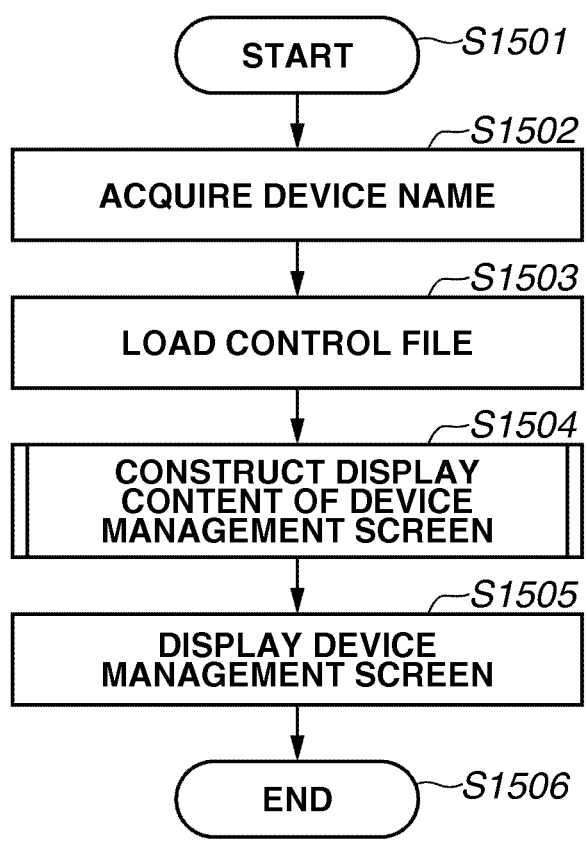
FIG. 12 is a flowchart illustrating an example of device management screen launching processing according to an exemplary embodiment of the present invention.

FIG. 12 is a flowchart illustrating an example of the device management screen launching processing. The processing content of the flowchart illustrated in FIG. 12 is not limited to the present exemplary embodiment and can be similarly referred to in the following descriptions of the second exemplary embodiment, the third exemplary embodiment, and the fourth exemplary embodiment.

If the device management 80 executes the device management screen launching processing in step S1308 illustrated in FIG. 9, then in step S1501 illustrated in FIG. 12, the device management 80 starts the device management screen launching processing. Further, if the device 503 in the folder 500 is selected by a user, the device management 80 starts the device management screen launching processing.

In step S1502, the device management control unit 902 acquires a device name selected by the folder 500. In the present exemplary embodiment, the selected device is the device 503. Therefore, the device management control unit 902 acquires the device name "ABC Kmmn." Then, in step S1503, based on the acquired device name, the device management control file reading unit 904 loads any one of the device management control files 800, 820, 830, 840, 850, and 870 illustrated in FIG. 15A, FIG. 15B, FIG. 17A, and FIG. 17B stored in step S1405 illustrated in FIG. 10.

Further, in step S1504, the device management control unit 902 executes the device management screen view content constructing processing illustrated in FIG. 16 based on the loaded device management control file. In step S1505, the device management control unit 902 causes the display unit 901 to display the device management screen 600 according to the view content of the device management screen constructed in step S1504 (the processing in step S1505 can be referred to as "display function"). Then, in step S1506, the device management 80 terminates the device management screen launching processing.

Figure 13A:
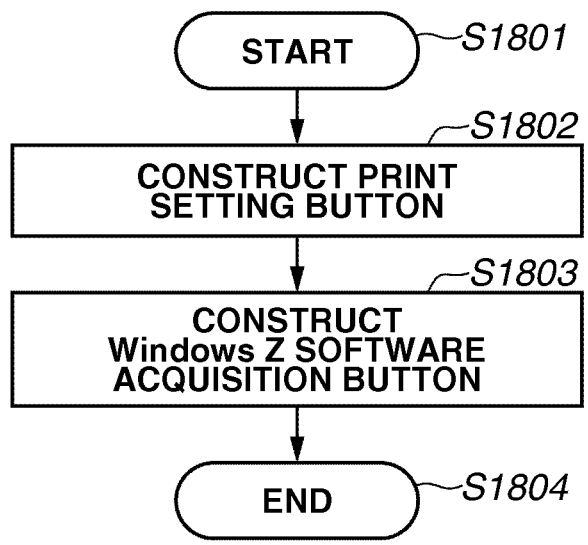
FIG. 13A is a flowchart illustrating an example of device management screen view content constructing processing, which can be performed when the OS running on the PC is Windows Z, according to an exemplary embodiment of the present invention.
Figure 13B:
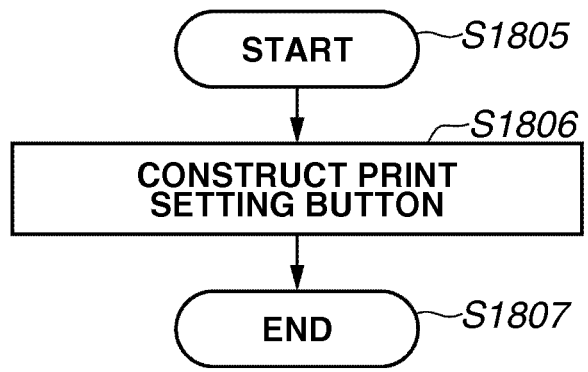
FIG. 13B is a flowchart illustrating an example of device management screen view content constructing processing, which can be performed when the OS running on the PC is Windows 7, according to an exemplary embodiment of the present invention.

FIGS. 13A and 13B are flowcharts illustrating examples of the device management screen view content constructing processing. FIG. 13A is a flowchart illustrating an example of the device management screen view content constructing processing, which can be performed when the OS currently running on the PC 1 is Windows Z. The device management control unit 902 executes the device management screen view content constructing processing illustrated in FIG. 13A based on the device management control file 800.

If the device management screen view content constructing processing is executed in step S1504 illustrated in FIG. 12, then in step S1801 illustrated in FIG. 13A, the device management control unit 902 starts the device management screen view content constructing processing. In step S1802, the device management control unit 902 constructs the print setting button 607 of ID1 (id="1"). In step S1803, the device management control unit 902 constructs the Windows Z software acquisition button 611 of ID2 (id="2"). In step S1804, the device management control unit 902 terminates the device management screen view content constructing processing and returns to the caller of the processing.

FIG. 13B is a flowchart illustrating an example of the device management screen view content constructing processing, which can be performed when the OS currently running on the PC 1 is Windows 7. The device management control unit 902 executes the device management screen view content constructing processing illustrated in FIG. 13B based on the device management control file 820.

If the device management screen view content constructing processing is executed in step S1504 illustrated in FIG. 12, then in step S1805 illustrated in FIG. 13B, the device management control unit 902 starts the device management screen view content constructing processing. In step S1806, the device management control unit 902 constructs the print setting button 607 of ID1 (id="1"). In step S1807, the device management control unit 902 terminates the device management screen view content constructing processing and returns to the caller of the processing.

FIG. 14 is a flowchart illustrating an example of web browser launching processing. The processing content of the flowchart illustrated in FIG. 14 is not limited to the present exemplary embodiment and can be similarly referred to in the following descriptions of the second exemplary embodiment, the third exemplary embodiment, and the fourth exemplary embodiment.

If the Windows Z software acquisition button 611 is pressed on the device management screen 600, then in step S1001, the web browser 143 starts the launching processing. In step S1001, the device management control unit 902 of the device management 80 illustrated in FIG. 6 sends the information described in the <dm:execute> elements 808, 813, 838, 848, 858, and 878 illustrated in FIGS. 15A, 15B, 17A, and 17B, via the link execution unit 903, to the OS. In step S1002, the OS acquires the information designating the URL information sent as an argument from the received information.

The OS confirms the presence of the information designating the URL information sent as an argument. If the URL designation information is present (YES in step S1003), the processing proceeds to step S1004. If the URL designation information is not present (NO in step S1003), the processing proceeds to step S1005. In the first to third exemplary embodiments, the URL designation can be performed based on the URL designation information of the argument described in the <dm:execute> elements 808 and 813, 838, 848, 858, and 878 illustrated in FIGS. 15A, 15B, 17A, and 17B. Therefore, the processing proceeds from step S1003 to step S1004. For example, if the web browser 143 is launched without setting any argument, the processing proceeds from step S1003 to step S1005.

In step S1004, the URL setting unit 908 sets the designated URL as an access destination. Then, the processing proceeds to step S1007. In step S1005, the URL setting unit 908 acquires a default URL that is set beforehand in the web browser 143. In step S1006, the URL setting unit 908 sets the acquired URL as an access destination. Then, the processing proceeds to step S1007.

In step S1007, the application control unit 907 checks the URL content having been set as the access destination in step S1004 or S1006. If the application control unit 907 determines that the URL represents an executable format file (YES in step S1007), the processing proceeds to step S1008. If the application control unit 907 determines that the URL represents a web site (page), namely when the URL does not represent an executable format file (NO in step S1007), the processing proceeds to step S1014.

In step S1008, the display control unit 909 displays the file download screen 637. If the display control unit 909 detects that the execution (Run) button 638 of the file download screen 637 is pressed by a user (YES in step S1009), the processing proceeds to step S1010. If the execution (Run) button 638 is not pressed (NO in step S1009), the processing proceeds to step S1011.

In step S1010, the file control unit 906 executes an executable format file designated by the URL. Then, the processing proceeds to step S1018. If the display control unit 909 detects that the storage (Save) button 639 of the file download screen 637 is pressed by a user (YES in step S1011), the processing proceeds to step S1012. If the storage (Save) button 639 is not pressed (NO in step S1011), the processing proceeds to step S1013. In step S1012, the file control unit 906 stores the executable format file designated by the URL. Then, the processing proceeds to step S1018.

If the display control unit 909 detects that the cancellation (Cancel) button 640 of the file download screen 637 is pressed by a user (YES in step S1013), the processing proceeds to step S1018. If the cancellation (Cancel) button 640 is not pressed (NO in step S1013), the processing returns to step S1009. In step S1014, the display control unit 909 displays the main screen 641 that includes the URL having been set as the access destination in the URL designation field 642 and the web site (page) designated by the URL in the page display field 643.

Then, the processing proceeds to step S1015. In step S1015, the application control unit 907 determines whether a message has been received from the OS. If the application control unit 907 confirms the reception of the message (YES in step S1015), the processing proceeds to step S1016. If the application control unit 907 confirms that the received message is a termination message (YES in step S1016), the processing proceeds to step S1018.

If the received message is not the termination message (NO in step S1016), then in step S1017, the application control unit 907 executes processing corresponding to each message. Then, the processing returns to step S1015. In step S1018, the display control unit 909 closes the file download screen 637 and the application control unit 907 terminates the web browser launching processing.

A second exemplary embodiment is characterized in that the device management control files 830 and 840 oriented to Windows Z described below with reference to FIGS. 15A and 15B, which are usable for a predetermined device, can also be used for the Windows 7 OS. FIGS. 15A and 15B illustrate examples of device management control file contents. Information illustrated in FIGS. 15A and 15B, namely the device management control files 830 and 840, is stored in the file storing unit 11 or 12. The device management control files 830 and 840 illustrated in FIGS. 15A and 15B are compatible not only with the Windows Z OS but also with the Windows 7 OS. Therefore, the device management control files 830 and 840 are usable for the Windows 7 OS. In FIGS. 15A and 15B, the contents already described with reference to FIG. 8A and FIG. 8B are using the same reference numbers and the descriptions thereof are not repeated.

In FIG. 15A, a <dm:metadataVersion> element 839 includes a setting of numerical value "2.0" that indicates version information of the device management control file 830. When the version information is "version 2.0", it means that the device management control file is usable for the Windows Z OS.

The <dm:functions> element 831 includes a setting relating to the <dm:function> elements 804 and 832, which indicates button and function information required to display "the print setting button 607 and the Windows Z software acquisition button 611" illustrated in FIG. 5B on the device management screen 600 to be launched and displayed when the MFP 3 is connected to the PC 1 if the OS currently running on the PC 1 is Windows Z.

The <dm:function> element 832 includes an attribute id="2", which indicates that the ID of the button is 2. A <dm:required> element 836 includes a setting relating to information relating to the conditions to be satisfied to display the Windows Z software acquisition button 611 of ID2. A <dm:osVersion> element 837 includes a setting relating to information relating to the version of the OS as a display condition of the Windows Z software acquisition button 611 of ID2. When the version of the OS is Windows Z, the Windows Z software acquisition button 611 of ID2 can be displayed on the device management screen 600.

In FIG. 15B, the <dm:functions> element 841 includes a setting relating to the <dm:function> elements 804 and 842, which indicates button and function information required to display "the print setting button 607 and the Windows Z software acquisition button 611" illustrated in FIG. 5B on the device management screen 600 to be launched and displayed when the MFP 3 is connected to the PC 1 if the OS currently running on the PC 1 is Windows Z.

A <dm:required> element 846 includes a setting relating to information indicating the conditions to be satisfied to display the Windows Z software acquisition button 611 of ID2. A <dm:osVersion> element 847 includes a setting relating to information indicating the version of the OS as a display condition of the Windows Z software acquisition button 611 of ID2. When the version of the OS is Windows Z, the Windows Z software acquisition button 611 of ID2 can be displayed on the device management screen 600.

A <dm:execute>http://abc.xxx/download/kmmn/wz/default.html</dm:execute> element 848 includes a setting of the URL "http://abc.xxx/download/kmmn/wz/default.html" of a web site (page), which can be accessed by the launched web browser 143 to download a kmmn_win_z_update.exe file that incorporates Windows Z software applicable to the device (i.e., the MFP 3) named as "Kmmn" of ABC Corporation.

For example, if it is required to display a software acquisition button when the version of the OS is not Windows Z, it can be realized by adding an attribute that indicates denial of the condition (i.e., invert="true"), as illustrated below, to the <dm:required> element 836 included in the <dm:function> element 832 illustrated in FIG. 15A. The added information can be referred to as a <dm:function> element 832' and a <dm:required> element 836', respectively.

```
<dm:function id="2"> ~832'
    <dm:name xml:lang="en-US">Get the Latest Software</dm:name>
    ~810
    <dm:description xml:lang="en-US">Get and install the latest
    software.</dm:description> ~811
    <dm:icon>get.ico</dm:icon> ~812
    <dm:required invert="true"> ~836'
        <dm:osVersion>Windows Z</dm:osVersion> ~837
    </dm:required>
    <dm:execute>http://abc.xxx/download/kmmn_win_z_update.exe</
    dm:execute> ~813
</dm:function>
```

When the above-described setting is performed, when the version of the OS is not Windows Z, a software acquisition button 611 can be displayed on the device management screen 600. The attribute that indicates denial of the condition (i.e., invert="true"), can be set in an arbitrary <dm:required> element.

According to the present Windows 7, information assuming the usage of the OS version described in the <dm:osVersion> elements 837 and 847 as a display condition of the Windows Z software acquisition button 611 of ID2 is not yet defined as information usable in the device management control file.

Accordingly, if the device management control files illustrated in FIG. 15A and FIG. 15B are installed for the Windows 7 OS, the Windows 7 OS cannot interpret the meaning of the information. Therefore, it is determined that the display conditions described in the <dm:osVersion> elements 837 and 847 of the <dm:required> elements 836 and 846 are not satisfied. As a result, the device management screen 600 illustrated in FIG. 5C is constructed and displayed. The device management screen 600 illustrated in FIG. 5C does not include the Windows Z software acquisition button 611 of ID2.

FIG. 5B illustrates an example case where a view content of the device management screen 600 is constructed according to a processing flow described below with reference to FIG. 16 and, as a result, the print setting button 607 of ID1 and the Windows Z software acquisition button 611 of ID2 are displayed.

When the device management control file 830 illustrated in FIG. 15A is used, the Windows Z software acquisition button 611 of ID2 can be displayed on the device management screen 600. If the button 611 is pressed by a user, the web browser 143 can be launched according to the processing flow described below with reference to FIG. 14. Further, the file download screen 637 of the web browser 143 can be displayed to enable the user to download the kmmn_win_z_update.exe file illustrated in FIG. 7B.

When the device management control file 840 illustrated in FIG. 15B is used, the Windows Z software acquisition button 611 of ID2 can be displayed on the device management screen 600. If the Windows Z software acquisition button 611 is pressed by a user, the web browser 143 can be launched according to the processing flow described below with reference to FIG. 14. Further, the main screen 641 of the web browser illustrated in FIG. 7C can be displayed. Then, a download page of Windows Z software for the device (i.e., the MFP 3) named as "Kmmn" of ABC Corporation can be displayed in the page display field 643.

FIG. 16 is a flowchart illustrating an example of the device management screen view content constructing processing. The device management control unit 902 executes the device management screen view content constructing processing described in FIG. 16 based on the device management control files 830 and 840.

If the device management screen view content constructing processing is executed in step S1504 illustrated in FIG. 12, then in step S1201 illustrated in FIG. 16, the device management control unit 902 starts the device management screen view content constructing processing. In step S1202, the device management control unit 902 constructs the print setting button 607 of ID1 (id="1"). In step S1203, the device management control unit 902 acquires the information required to construct the Windows Z software acquisition button 611 of ID2 (id="2"), namely the information included in the <dm:function> elements 832 and 842.

In step S1204, the device management control unit 902 confirms whether the above-described information includes the <dm:required> elements 836 and 846 that indicate the conditions to be satisfied to construct the Windows Z software acquisition button 611 of ID2 (id="2"). If the conditions are included, the device management control unit 902 confirms the presence of the <dm:osVersion> elements 837 and 847 describing the version of the OS. If the device management control unit 902 determines that the <dm:osVersion> elements 837 and 847 are included (YES in step S1205), the processing proceeds to step S1206. If the device management control unit 902 determines that the <dm:osVersion> elements 837 and 847 are not included (NO in step S1205), the processing proceeds to step S1210 (the processing in step S1205 can be referred to as "determination function").

In step S1206, the device management control unit 902 acquires version information of the OS using the GetOSVersion function (the processing in step S1206 can be referred to as "acquisition function"). Then, in step S1207, the device management control unit 902 compares the acquired version information of the OS with the setting relating to the OS version condition in the <dm:osVersion> elements 837 and 847. In the present exemplary embodiment, to simplify the description, it is now presumed that the return value of the above-described function is "Windows 7" when the OS is Windows 7 and "Windows Z" when the OS is Windows Z.

If the device management control unit 902 determines that the version information of the OS acquired in step S1206 coincides with the setting relating to the OS version condition in the <dm:osVersion> elements 837 and 847 (YES in step S1208), the processing proceeds to step S1209. On the other hand, if the device management control unit 902 determines that the acquired OS version information does not coincide with the OS version condition in the <dm:osVersion> elements 837 and 847 (NO in step S1208), the processing proceeds to step S1210. In step S1209, the device management control unit 902 constructs the Windows Z software acquisition button 611 of ID2 (id="2"). In step S1210, the device management control unit 902 terminates the device management screen view content constructing processing and returns to the caller of the processing.

If the present OS is Windows 7, the device management control unit 902 performs processing similar to steps S1201 to S1203 of the flowchart illustrated in FIG. 16. More specifically, the device management control unit 902 acquires the information required to construct the Windows Z software acquisition button 611 of ID2 (id="2"), namely, the information included in the <dm:function> elements 832 and 842.

However, the device management control unit 902 performs processing differently in subsequent steps. More specifically, in step S1204, the device management control unit 902 of the Windows 7 OS cannot interpret the meaning of the <dm:osVersion> elements 837 and 847 included in the <dm:

required> elements 836 and 846. Therefore, the device management control unit 902 does not construct the Windows Z software acquisition button 611 of ID2 (id="2"). The processing proceeds to step S1210. In step S1210, the device management control unit 902 terminates the device management screen view content constructing processing and returns to the caller of the processing.

An example according to a third exemplary embodiment is described below, in which the device management control file oriented to Windows 7 is identical to the device management control file oriented to Windows Z. In the framework of the device management 80 (Device Stage), the Windows 7 OS and the Windows Z OS are not capable of switching display/non-display of a button (task) depending on the version of the OS.

More specifically, the device management control files 850 and 870 described below with reference to FIGS. 17A and 17B are oriented to Windows 7 and are usable not only for the Windows 7 OS but also for the Windows Z OS. However, it is unfeasible to switch the display/non-display of a button (task) depending on the version of the OS based on only the device management control files 850 and 870.

FIGS. 17A and 17B illustrate examples of device management control file contents. Information illustrated in FIGS. 17A and 17B, namely the device management control files 850 and 870, is stored in the file storing unit 11 or 12. The device management control files 850 and 870 illustrated in FIGS. 17A and 17B are usable not only for the Windows 7 OS but also for the Windows Z OS. More specifically, either one of the device management control files 850 and 870 is prepared for the MFP 3 and usable for both the Windows 7 OS and the Windows Z OS. In FIGS. 17A and 17B, the contents already described with reference to FIG. 8A and FIG. 8B are using the same reference numbers and the descriptions thereof are not repeated.

In FIG. 17A, the <dm:functions> element 851 includes a setting relating to the <dm:function> elements 804 and 852, which indicates button and function information required to display "the print setting button 607 and the Windows Z software acquisition button 611" illustrated in FIG. 5B on the device management screen 600 to be launched and displayed when the MFP 3 is connected to the PC 1 if the OS currently running on the PC 1 is Windows Z.

The <dm:function> element 852 includes an attribute id="2", which indicates that the ID of the button is 2. A <dm:required> element 856 includes a setting relating to information indicating the conditions to be satisfied to display the Windows Z software acquisition button 611 of ID2. A <dm:keywordInRegistry key="HKLM¥SOFTWARE¥ABC¥Printer Driver" name="OSVersion">Windows Z</dm:keywordInRegistry> element 857 includes a setting relating to registry information as display conditions of the Windows Z software acquisition button 611 of ID2.

As example conditions to display the Windows Z software acquisition button 611 of ID2, the presence of the following registry information is required. HKEY_LOCAL_MACHINE¥SOFTWARE¥ABC¥PrinterDriver¥
Name: OSVersion
Type: REG_SZ
Data: Windows Z
The registry information can be stored in the printer driver 50 when the printer driver 50 is installed and launched, or launched for a printing operation.

In FIG. 17B, the <dm:functions> element 871 includes a setting relating to the <dm:function> elements 804 and 872, which indicates button and function information required to display "the print setting button 607 and the Windows Z software acquisition button 611" illustrated in FIG. 5B on the device management screen 600 to be launched and displayed when the MFP 3 is connected to the PC 1 if the OS currently running on the PC 1 is Windows Z.

A <dm:required> element 876 includes a setting relating to information indicating the conditions to be satisfied to display the Windows Z software acquisition button 611 of ID2. A <dm:keywordInRegistry key="PRINTER_DRIVER_FRIENDLY_NAME" name="OSVersion">Windows Z</dm:keywordInRegistry> element 877 includes a setting relating to registry information as display conditions of the Windows Z software acquisition button 611 of ID2.

As example conditions to display the Windows Z software acquisition button 611 of ID2, the presence of the following registry information is required.

HKEY_LOCAL_MACHINE¥SOFTWARE¥Microxxxx¥Windows Z¥CurrentVersion¥Print¥Printers¥<friendlyname>¥Printer Driver Data¥

Name: OSVersion
Type: REG_SZ
Data: Windows Z
In the present exemplary embodiment, <friendly name> represents a friendly name of the printer driver. The registry information can be stored in the printer driver 50 when the printer driver 50 is installed and launched, or launched for a printing operation.

PRINTER_DRIVER_FRIENDLY_NAME is a variable that represents a registry key using the friendly name of the printer driver. In FIG. 5A, the friendly name "ABC Kmmn" is added to the device 503. A user can change the friendly name and use an arbitrary character string, such as "Koichi's Printer", if allowed by the OS.

It is now presumed that information in the registry key that includes the friendly name is used as a condition to display the Windows Z software acquisition button 611 of ID2. Further, it is presumed that the full path of the registry key is designated as illustrated in FIG. 17A (see the <dm:keywordInRegistry> element 857) and the friendly name "ABC Kmmn" is included in the full path.

In this case, if the user uses a changed friendly name (e.g., "Koichi's Printer"), the OS changes the full path of the registry key to a content including "Koichi's Printer." Accordingly, the changed friendly name does not coincide with the setting condition in the <dm:keywordInRegistry> element 857. As a result, the Windows Z software acquisition button 611 of ID2 cannot be displayed.

To solve the above-described problem, the <dm:keywordInRegistry> element 877 illustrated in FIG. 17B includes a setting relating to the variable "PRINTER_DRIVER_FRIENDLY_NAME." Thus, even in a case where a user changes the friendly name, the OS can identify the full path of the registry key that reflects the change of the friendly name. Thus, the Windows Z software acquisition button 611 of ID2 can be correctly displayed.

FIG. 5B illustrates an example case where a view content of the device management screen 600 is constructed according to a processing flow described below with reference to FIG. 18 and, as a result, the print setting button 607 of ID1 and the Windows Z software acquisition button 611 of ID2 are displayed.

Figure 18:
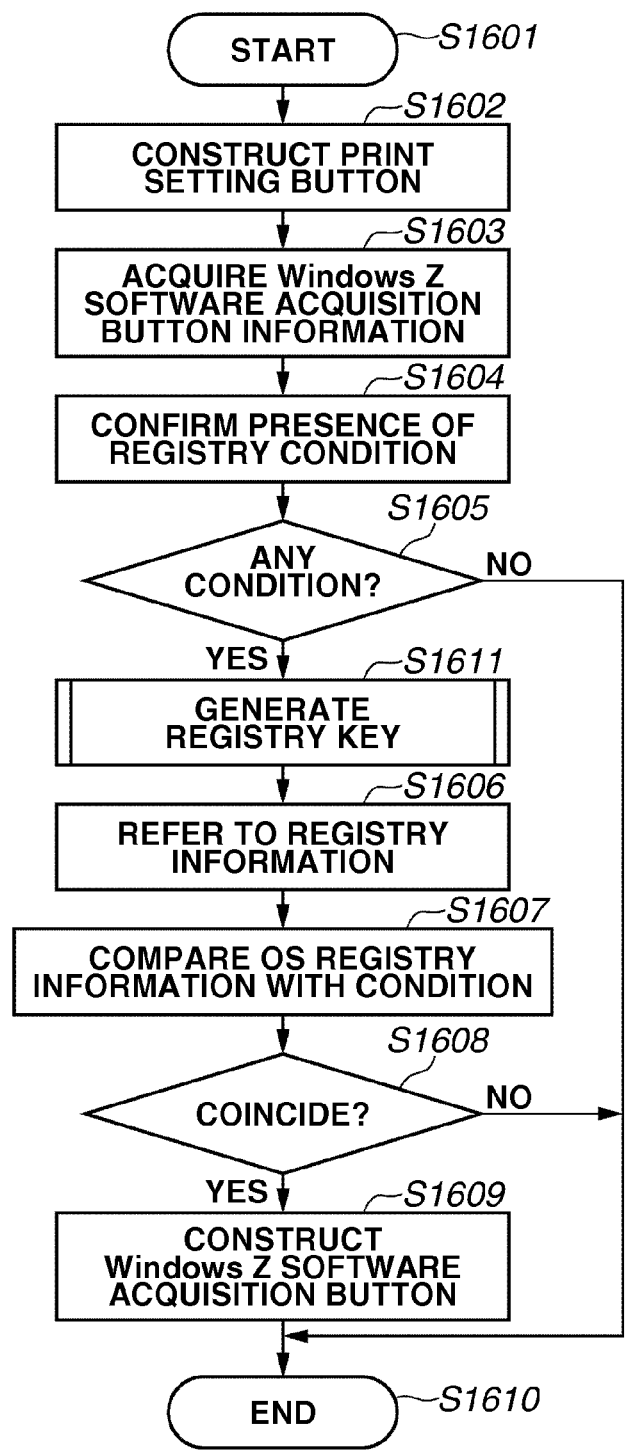
FIG. 18 is a flowchart illustrating an example of device management screen view content constructing processing according to an exemplary embodiment of the present invention.

FIG. 18 is a flowchart illustrating an example of the device management screen view content constructing processing.

The device management control unit 902 executes the device management screen view content constructing processing illustrated in FIG. 18 based on the device management control files 850 and 870.

If the device management screen view content constructing processing is executed in step S1504 illustrated in FIG. 12, then in step S1601 illustrated in FIG. 18, the device management control unit 902 starts the device management screen view content constructing processing. In step S1602, the device management control unit 902 constructs the print setting button 607 of ID1 (id="1"). In step S1603, the device management control unit 902 acquires the information required to construct the Windows Z software acquisition button 611 of ID2 (id="2"), namely, the information included in the <dm:function> elements 852 and 872.

In step S1604, the device management control unit 902 confirms whether the information includes the <dm:required> elements 856 and 876 that indicate the conditions to be satisfied to construct the Windows Z software acquisition button 611 of ID2 (id="2"). If the conditions are included, the device management control unit 902 confirms whether the <dm:keywordInRegistry> elements 857 and 877 describing the registry information are included.

If the device management control unit 902 determines that the <dm:keywordInRegistry> elements 857 and 877 are included (YES in step S1605), the processing proceeds to step S1611. If the device management control unit 902 determines that the <dm:keywordInRegistry> elements 857 and 877 are not included (NO in step S1605), the processing proceeds to step S1610 (the processing in step S1605 can be referred to as "determination function").

In step S1611, the device management control unit 902 executes registry key generation processing described below with reference to FIG. 19. Then, the processing proceeds to step S1606. In step S1606, the device management control unit 902 refers to registry information in the OS (the processing in step S1606 can be referred to as "acquisition function"). In step S1607, the device management control unit 902 compares the registry information in the OS with the setting condition of registry information in the <dm:keywordInRegistry> elements 857 and 877 (i.e., information converted by the registry key generated in step S1611).

If the device management control unit 902 has found the registry information in the OS that coincides with the registry information set in the <dm:keywordInRegistry> elements 857 and 877 (YES in step S1608), the processing proceeds to step S1609. If the device management control unit 902 has not found the registry information (NO in step S1608), the processing proceeds to step S1610. In step S1609, the device management control unit 902 constructs the Windows Z software acquisition button 611 of ID2 (id="2"). In step S1610, the device management control unit 902 terminates the device management screen view content constructing processing and returns to the caller of the processing.

Figure 19:
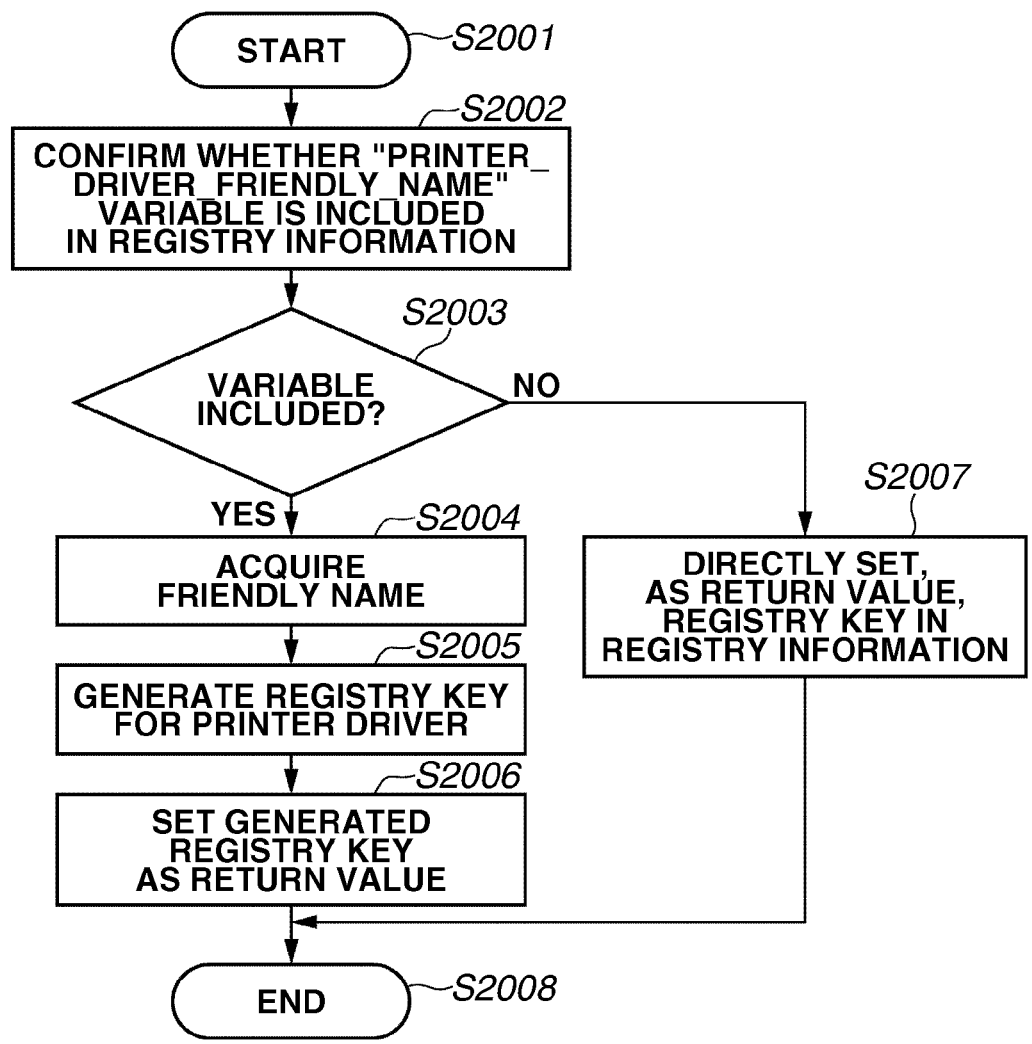
FIG. 19 is a flowchart illustrating an example of registry key generation processing according to an exemplary embodiment of the present invention.

FIG. 19 is a flowchart illustrating an example of the registry key generation processing. If the registry key generation processing is executed in step S1611 illustrated in FIG. 18, then in step S2001 illustrated in FIG. 19, the device management control unit 902 starts the registry key generation processing. In this case, the device management control unit 902 starts the registry key generation processing based on the registry information set in the <dm:keywordInRegistry> elements 857 and 877.

In step S2002, the device management control unit 902 confirms whether the registry information set in the <dm:keywordInRegistry> elements 857 and 877 includes the variable "PRINTER_DRIVER_FRIENDLY_NAME." If the device management control unit 902 determines that the registry information includes the variable "PRINTER_DRIVER_FRIENDLY_NAME" (YES in step S2003), the processing proceeds to step S2004. If the device management control unit 902 determines that the registry information does not include the variable "PRINTER_DRIVER_FRIENDLY_NAME" (NO in step S2003), the processing proceeds to step S2007.

In step S2004, the device management control unit 902 acquires the friendly name attached to the device 503 (i.e., "ABC Kmmn" according to the example illustrated in FIG. 5A). In step S2005, the device management control unit 902 generates the following registry key with reference to the acquired friendly name.

HKEY_LOCAL_MACHINE¥SOFTWARE¥Microxxxx¥Windows Z¥CurrentVersion¥Print¥Printers¥<friendlyname>¥Printer Driver Data¥

For example, according to the device 503 illustrated in FIG. 5A, the device management control unit 902 generates the following registry key.

HKEY_LOCAL_MACHINE¥SOFTWARE¥Microxxxx¥Windows Z¥CurrentVersion¥Print¥Printers¥ABC Kmmn¥Printer Driver Data¥

In the present exemplary embodiment, the "HKEY_LOCAL_MACHINE¥SOFTWARE¥Microxxxx¥Windows Z¥CurrentVersion¥Print¥Printers¥ key is a route key of the registry information of the printer driver installed on the OS executed in the PC 1 (i.e., the Windows Z according to the illustrated example).

The registry key for the printer driver generated by the device management control unit 902 includes, as additional information following the route key, a sub key that indicates the friendly name of the printer driver (i.e., "ABC Kmmn" according to the illustrated example). Further, the generated registry key for the printer driver includes, as additional information following the sub key of the friendly name, a sub key of Printer Driver Data that includes information relating to the printer driver.

In step S2006, the device management control unit 902 sets the generated registry key as a return value. Then, the processing proceeds to step S2008. In step S2007, the device management control unit 902 directly sets, as a return value, the registry information set in the <dm:keywordInRegistry> elements 857 and 877. Then, the processing proceeds to step S2008. In step S2008, the device management control unit 902 returns the registry key set in the return value to the caller. Then, the device management control unit 902 terminates the registry key generation processing and returns to the caller of the processing.

Figure 20:
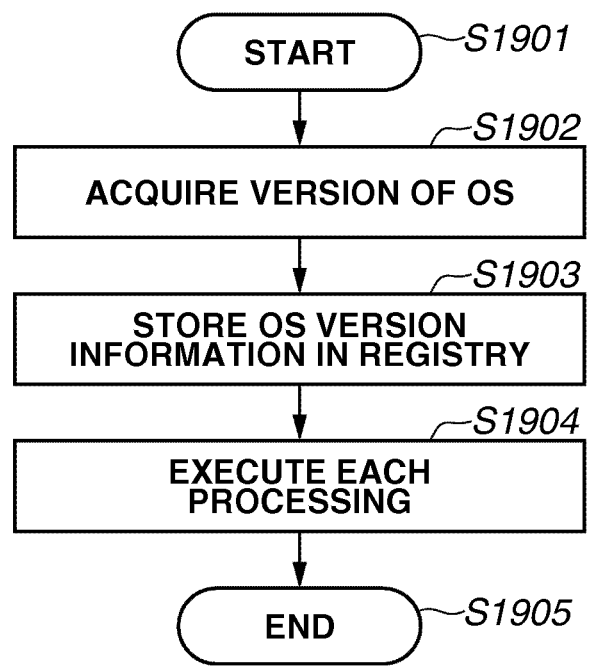
FIG. 20 is a flowchart illustrating an example of printer driver launching processing according to an exemplary embodiment of the present invention.

FIG. 20 is a flowchart illustrating an example of printer driver launching processing. The program relating to the flowchart illustrated in FIG. 20 is stored in the HDD 202 and can be executed by the CPU 204 when loaded into the RAM 201.

When the printer driver 50 is installed and launched, or launched for a printing operation, in step S1901, the OS starts the printer driver launching processing illustrated in FIG. 20. In step S1902, the printer driver 50 acquires version information of the OS using the GetOSVersion function.

In step S1903, the printer driver 50 stores the acquired version information of the OS in the registry. In the present exemplary embodiment, to simplify the description, it is now presumed that the return value of the above-described function is "Windows 7" when the OS is Windows 7 and "Windows Z" when the OS is Windows Z.

The printer driver 50 stores the version information of the OS in the following two registries. HKEY_LOCAL_MACHINE¥SOFTWARE¥ABC¥PrinterDriver¥
Name: OSVersion
Type: REG_SZ
Data: Windows Z ---
HKEY_LOCAL_MACHINE¥SOFTWARE¥Microxxxx¥Windows Z¥CurrentVersion¥Print¥Printers¥<friendlyname>¥Printer Driver Data¥
---

Name: OSVersion
Type: REG_SZ
Data: Windows Z

In step S1904, the printer driver 50 performs each processing according to launching requirements. Then, in step S1905, the OS terminates the printer driver launching processing.

An example according to a fourth exemplary embodiment is described below, in which the device management control file oriented to Windows 7 is identical to the device management control file oriented to Windows Z. In the framework of the device management 80 (Device Stage), the Windows 7 OS and the Windows Z OS are not capable of switching display/non-display of a button (task) depending on the version of the OS.

More specifically, a device management control file 880 described below with reference to FIG. 21 is oriented to Windows 7 and is usable not only for the Windows 7 OS but also for the Windows Z OS. Further, it is feasible to switch the display/non-display of a button (task) depending on the version of the OS based on only the device management control file 880.

FIG. 21 illustrates an example of device management control file contents. Information illustrated in FIG. 21, more specifically, the device management control file 880, is stored in the file storing unit 11 or 12. The device management control file 880 illustrated in FIG. 21 is usable not only for the Windows 7 OS but also for the Windows Z OS. More specifically, only the device management control file 880 is prepared for the MFP 3 and usable for both the Windows 7 OS and the Windows Z OS. In FIG. 21, the contents already described with reference to FIG. 8A and FIG. 8B are using the same reference numbers and the descriptions thereof are not repeated.

In FIG. 21, a <dm:functions> element 881 includes a setting relating to <dm:function> elements 804 and 882, which indicates button and function information required to display "the print setting button 607 and the Windows Z software acquisition button 611" illustrated in FIG. 5B on the device management screen 600 to be launched and displayed when the MFP 3 is connected to the PC 1 if the OS currently running on the PC 1 is Windows Z.

The <dm:function> element 882 includes an attribute id="2", which indicates that the ID of the button is 2. A <dm:required> element 886 includes a setting relating to information indicating conditions to be satisfied to display the Windows Z software acquisition button 611 of ID2. A <dm:keywordInRegistry key="HKLM¥SOFTWARE¥Microsoft¥Windows NT¥CurrentVersion" name="CurrentVersion">6.x</dm:keywordInRegistry> element 887 includes a setting relating to registry information as display conditions of the Windows Z software acquisition button 611 of ID2.

As example conditions to display the Windows Z software acquisition button 611 of ID2, the presence of the following registry information is required.

---
HKEY_LOCAL_MACHINE¥SOFTWARE¥Microsoft¥Windows NT¥CurrentVersion
---

Name: CurrentVersion
Type: REG_SZ
Data: 6.x

The above-described registry information is stationary information to be described in the registry when the OS is installed on the PC 1, in which the version number "6.x" of the Windows indicates that the OS is Windows Z.

FIG. 5B illustrates an example case where a view content of the device management screen 600 is constructed according to the processing flow described below with reference to FIG. 18 in the fourth exemplary embodiment and, as a result, the print setting button 607 of ID1 and the Windows Z software acquisition button 611 of ID2 are displayed. The device management control unit 902 executes the device management screen view content constructing processing illustrated in FIG. 18 based on the device management control file 880.

If the device management screen view content constructing processing is executed in step S1504 illustrated in FIG. 12, then in step S1601 illustrated in FIG. 18, the device management control unit 902 starts the device management screen view content constructing processing. In step S1602, the device management control unit 902 constructs the print setting button 607 of ID1 (id="1"). In step S1603, the device management control unit 902 acquires the information required to construct the Windows Z software acquisition button 611 of ID2 (id="2"), namely the information included in the <dm:function> element 882.

In step S1604, the device management control unit 902 confirms whether the information includes the <dm:required> element 886 that indicates the conditions to be satisfied to construct the Windows Z software acquisition button 611 of ID2 (id="2"). If the conditions are included, the device management control unit 902 confirms whether the <dm:keywordInRegistry> element 887 describing the registry information is included.

If the device management control unit 902 determines that the <dm:keywordInRegistry> element 887 is included (YES in step S1605), the processing proceeds to step S1611. If the device management control unit 902 determines that the <dm:keywordInRegistry> element 887 is not included (NO in step S1605), the processing proceeds to step S1610 (the processing in step S1605 can be referred to as "determination function"). In step S1611, the device management control unit 902 executes the registry key generation processing described with reference to FIG. 19. Then, the processing proceeds to step S1606.

In step S1606, the device management control unit 902 refers to the registry information in the OS (the processing in step S1606 can be referred to as "acquisition function"). In step S1607, the device management control unit 902 compares the registry information in the OS with the setting condition of registry information in the <dm:keywordInRegistry> element 887 (i.e., information converted by the registry key generated in step S1611).

If the device management control unit 902 has found the registry information in the OS that coincides with the registry information set in the <dm:keywordInRegistry> element 887

(YES in step S1608), the processing proceeds to step S1609. If the device management control unit 902 has not found the registry information (NO in step S1608), the processing proceeds to step S1610. In step S1609, the device management control unit 902 constructs the Windows Z software acquisition button 611 of ID2 (id="2"). In step S1610, the device management control unit 902 terminates the device management screen view content constructing processing and returns to the caller of the processing.

For example, when the Windows 7 OS is installed on a PC, the following stationary information is described in the registry.

---
HKEY_LOCAL_MACHINE¥SOFTWARE¥Microsoft¥Windows NT¥CurrentVersion

---

Name: CurrentVersion
Type: REG_SZ
Data: 6.1

In the present exemplary embodiment, the version number "6.1" indicates that the OS is Windows 7. The version number "6.1" of Windows 7 does not coincide with the version number "6.x" described in the <dm:keywordlnRegistry> element 887 as one of the display conditions for the Windows Z software acquisition button 611 of ID2. Accordingly, when the OS installed on the PC is Windows 7 (i.e., the OS other than Windows Z), the Windows Z software acquisition button 611 is not displayed and only the print setting button 607 of ID1 is displayed on the device management screen 600. As described above, only when the OS installed on the PC is Windows Z, both the print setting button 607 of ID1 and the Windows Z software acquisition button 611 of ID2 can be displayed on the device management screen 600.

Other Embodiments

Further, as another exemplary embodiment, the present invention can be realized by executing the following processing. More specifically, the processing includes providing software (program) capable of realizing the functions of the above-described exemplary embodiments to a system or an apparatus via a network or an appropriate storage medium and causing a computer (or a central processing unit (CPU) or a micro-processing unit (MPU)) of the system or the apparatus to read and execute the program.

Further, the device management 80 illustrated in FIG. 6 has been employed as an example of the application in the above-described exemplary embodiments. However, the application is not limited to the above-described example. Employing any other arbitrary application that can realize similar functions is effective to realize the present invention.

Further, the web browser 143 illustrated in FIGS. 7B and 7C has been employed as an example of the application in the above-described exemplary embodiments. However, the application is not limited to the above-described example. Employing an arbitrary application capable of using a device, such as an image or document reading application, is effective to realize the present invention.

Further, the personal computer has been used as an example of the information processing apparatus in the above-described exemplary embodiment. However, the information processing apparatus is not limited to the above-described example. For example, employing an arbitrary information processing apparatus (or a comparable terminal), such as a Digital Versatile Disk (DVD) player, a game player, a set-top box, or a home internet appliance, which can be used in various ways, is effective to realize the present invention.

Further, the MFP has been employed as an example of the peripheral apparatus in the above-described exemplary embodiments. However, the peripheral apparatus can be any other apparatus, such as a copying machine, a facsimile machine, a scanner, a digital camera, or a comparable multi-function apparatus.

Further, the Windows 7 OS or the Windows Z OS (or a comparable OS) has been used as an example of the OS in the above-described exemplary embodiment. However, the OS is not limited to the above-described examples. An arbitrary OS can be used. Further, the Ethernet has been used as an example of the network 4 in the above-described exemplary embodiment. However, the network 4 is not limited to the above-described example. An arbitrary network configuration can be employed.

Further, the Ethernet has been used as an example of the interface between the PC 1 and the MFP 3 (or the MFP 7) in the above-described exemplary embodiments. However, the interface is not limited to the above-described example. For example, any other arbitrary interface (e.g., wireless LAN, Institute of Electrical and Electronic Engineers (IEEE) 1394, Bluetooth, or USB) is employable.

Further, the WSD has been employed as an example of the web service protocol in the above-described exemplary embodiments. However, the web service protocol is not limited to the above-described example. For example, any other arbitrary protocol (e.g., IHV unique protocol) is usable.

Further, when the Windows Z software acquisition button 611 is pressed on the device management screen 600 in the above-described exemplary embodiments, launching of the web browser 143 can be performed in such a way as to acquire Windows Z software easily for an appropriate device (driver). However, the present invention is not limited to the above-described example. For example, it is useful to designate an appropriate device (driver) name when an arbitrary application is launched on the device management screen, or when a web site is linked, or when a service is provided.

Further, in the above-described exemplary embodiments, when the OS currently operating on the PC 1 is Windows Z, the function for acquiring the OS, namely the Windows Z software (i.e., the Windows Z software acquisition button 611), can be displayed on the device management screen 600. However, the present invention is not limited to the above-described example. It is useful to display a specific button (or a task) on the device management screen 600 and execute the function relating to the button only when it is required to change the button (or the task) and the function to be displayed on the device management screen 600 for each OS, or when the OS currently running on the PC is a specific operating system.

As described above, the exemplary embodiments of the present invention can provide a device management screen that can provide appropriate display and functions according to the use environment of a user. Further, according to the above-described exemplary embodiments, when an application is launched to control a peripheral apparatus, it is feasible to control the peripheral apparatus automatically and appropriately with reference to the use environment of a user, especially according to the version of the OS. Thus, the exemplary embodiments of the present invention can provide appropriate display and functions according to the use environment of a user.

Although the present invention has been described with reference to preferred exemplary embodiments, the present invention is not limited to specific exemplary embodiments and can be variously modified and changed within the scope of the present invention.

As described above, according to the above-described exemplary embodiments, the Windows Z software acquisition button 611 can be displayed on the device management screen 600 as a specific function usable only when a specific OS (e.g., Windows Z OS) is running on the PC 1, to enable a user to acquire Windows Z software easily by pressing the displayed button. As described above, it is feasible to customize a button (task) or a function relating to the button to be displayed on the device management screen 600 and control display/non-display of the button (or task) depending on the version of the OS.

More specifically, according to the present invention, the software acquisition button is not displayed when the currently running OS is the first version OS (e.g., Windows 7) and can be displayed when the currently running OS is the second version OS (e.g., Windows Z).

Further, when the Windows 7 OS is running on the PC 1, the Windows Z software acquisition button 611 is not displayed on the device management screen 600. Therefore, it is feasible to prevent a user from erroneously installing Windows Z software on a PC when the Windows 7 OS is running on the PC. As described above, it is feasible to provide the device management screen 600 and functions according to the use environment of a user that depends on the version of the OS to each user.

Further, it is feasible to provide a specific button to execute a function unique to Windows Z on the device management screen 600 or provide a function that can be displayed only when the Windows Z OS is running on the PC to enable a user to execute the displayed function.

As described above, the exemplary embodiments of the present invention can realize a peripheral apparatus control system that is excellent in user operability. Further, the exemplary embodiments of the present invention can display a button (or task), with reference to registry information including a friendly name of the device, on the device management screen 600 and associate the displayed task (or button) with a related function.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s).

For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-243255 filed Oct. 29, 2010 and No. 2011-185074 filed Aug. 26, 2011 which are hereby incorporated by reference herein in their entirety.

What is claimed is:

1. An information processing apparatus comprising:
an acquisition unit configured to acquire first version information of an operating system of the information processing apparatus;
a determination unit configured to determine whether the first version information acquired by the acquisition unit coincides with second version information of the operating system as a display condition of a predetermined object set in control information which defines information required to display a printing apparatus management screen; and
a display unit configured to display the printing apparatus management screen including the predetermined object and a printing preference object to display a printing preference screen, if the determination unit determines that the first version information of the operating system acquired by the acquisition unit coincides with the second version information of the operating system as the display condition of the predetermined object set in the control information.

2. The information processing apparatus according to claim 1, further comprising:
a selection unit configured to select the control information based on the first version information of the operating system acquired by the acquisition unit; and
an installation unit configured to install the control information selected by the selection unit into an information processing apparatus.

3. The information processing apparatus according to claim 1, further comprising:
a storage unit configured to store the first version information of the operating system acquired by the acquisition unit in a registry,
wherein the determination unit determines whether the first version information of the operating system stored in the registry by the storage unit coincides with the second version information of the operating system as the display condition of the predetermined object set in the control information, and
wherein the display unit displays the printing apparatus management screen including the predetermined object if the determination unit determines that the first version information of the operating system stored in the registry by the storage unit coincides with the second version information of the operating system as the display condition of the predetermined object set in the control information.

4. The information processing apparatus according to claim 1, further comprising a second determination unit configured to determine whether an attribute indicating denial of the display condition of the predetermined object is set in the control information,
wherein the display unit displays the printing apparatus management screen including the predetermined object, if the second determination unit determines that the attribute of denial of the display condition of the predetermined object is set in the control information and the determination unit determines that the first version information of the operating system acquired by the acquisition unit does not coincides with the second version information of the operating system as the display condition of the predetermined object set in the control information.

5. The information processing apparatus according to claim 1, wherein a driver of the printing apparatus and the control information are installed to the information processing apparatus in a case where the printing apparatus is connected to the information processing apparatus.

6. The information processing apparatus according to claim 1, wherein the predetermined object is for downloading software.

7. The information processing apparatus according to claim 1, wherein the predetermined object is not displayed in a printing apparatus management screen of another information processing apparatus, if version information of an operating system of the other information processing apparatus does not coincide with the second version information of the operating system as the display condition of the predetermined object set in the control information.

8. A display method that can be executed by an information processing apparatus, the method comprising:
acquiring first version information of an operating system;
determining whether the acquired first version information acquired coincides with second version information of the operating system as a display condition of a predetermined object set in control information which defines information required to display a printing apparatus management screen; and
displaying the printing apparatus management screen including the predetermined object and a printing preference object to display a printing preference screen, if it is determined that the acquired first version information of the operating system coincides with the second version information of the operating system, as the display condition of the predetermined object set in the control information.

9. The method according to claim 8, further comprising:
selecting the control information based on the first version information of the acquired operating system; and
installing the selected control information into an information processing apparatus.

10. The method according to claim 8, further comprising:
storing the first version information of the acquired operating system in a registry,
determining whether the first version information of the operating system stored in the registry coincides with the second version information of the operating system as the display condition of the predetermined object set in the control information, and
displaying the printing apparatus management screen including the predetermined object if it is determined that the first version information of the operating system stored in the registry coincides with the second version information of the operating system as the display condition of the predetermined object set in the control information.

11. The method according to claim 8, further comprising:
determining whether an attribute indicating denial of the display condition of the predetermined object is set in the control information,
displaying the printing apparatus management screen including the predetermined object, if it is determined that the attribute of denial of the display condition of the predetermined object is set in the control information and it is determined that the first version information of the acquired operating system does not coincide with the second version information of the operating system as the display condition of the predetermined object set in the control information.

12. The method according to claim 8, wherein a driver of the printing apparatus and the control information are installed to the information processing apparatus in a case where the printing apparatus is connected to the information processing apparatus.

13. The method according claim 8, wherein the predetermined object is for downloading software.

14. The method according to claim 8, wherein the predetermined object is not displayed in a printing apparatus management screen of another information processing apparatus, if version information of an operating system of the other information processing apparatus does not coincide with the second version information of the operating system as the display condition of the predetermined object set in the control information.

15. A computer-readable non-transitory storage medium storing a program that causes a computer to execute display processing, the program comprising:
computer-executable instructions for acquiring first version information of an operating system;
computer-executable instructions for determining whether the acquired first version information coincides with second version information of the operating system as a display condition of a predetermined object set in control information which defines information required to display a printing apparatus management screen; and
computer-executable instructions for displaying the printing apparatus management screen including the predetermined object and a printing preference object to display a printing preferences screen, if it is determined that the acquired first version information of the operating system coincides with the second version information of the operating system, as the display condition of the predetermined object set in the control information.

16. The computer-readable storage medium according to claim 15, further comprising:
computer-executable instructions for selecting the control information based on the first version information of the acquired operating system; and
computer-executable instructions for installing the selected control information into an information processing apparatus.

17. The computer-readable storage medium according to claim 15, further comprising:
computer-executable instructions for storing the first version information of the acquired operating system in a registry,
computer-executable instructions for determining whether the first version information of the operating system stored in the registry coincides with the second version information of the operating system as the display condition of the predetermined object set in the control information, and
computer-executable instructions for displaying the printing apparatus management screen including the predetermined object if it is determined that the first version information of the operating system stored in the registry coincides with the second version information of the operating system as the display condition of the predetermined object set in the control information.

18. The computer-readable storage medium according to claim 15, further comprising:
computer-executable instructions for determining whether an attribute indicating denial of the display condition of the predetermined object is set in the control information,
computer-executable instructions for displaying the printing apparatus management screen including the predetermined object, if it is determined that the attribute of denial of the display condition of the predetermined object is set in the control information and it is determined that the first version information of the acquired operating system does not coincide with the second version information of the operating system as the display condition of the predetermined object set in the control information.

19. The computer-readable storage medium according to claim 15, wherein a driver of the printing apparatus and the control information are installed to the information processing apparatus in a case where the printing apparatus is connected to the information processing apparatus.

20. The computer-readable storage medium according to claim 15, wherein the predetermined object is for downloading software.

21. The computer-readable storage medium according to claim 15, wherein the predetermined object is not displayed in a printing apparatus management screen of another information processing apparatus, if version information of an operating system of the other information processing apparatus does not coincide with the second version information of the operating system as the display condition of the predetermined object set in the control information.

\* \* \* \* \*